United States Patent [19]
Takahashi

[11] Patent Number: 5,701,202
[45] Date of Patent: Dec. 23, 1997

[54] HEAD OR FACE MOUNTED IMAGE DISPLAY APPARATUS

[75] Inventor: Koichi Takahashi, Hachioji, Japan

[73] Assignee: Olympus Optical Co., Ltd., Tokyo, Japan

[21] Appl. No.: 505,516

[22] Filed: Jul. 21, 1995

[30] Foreign Application Priority Data

May 18, 1995 [JP] Japan ................................ 7-120034

[51] Int. Cl.$^6$ .................................................. G02B 27/14
[52] U.S. Cl. ........................................... 359/631; 359/633
[58] Field of Search ................................ 359/631–632, 359/636, 630, 633, 720, 384

[56] References Cited

U.S. PATENT DOCUMENTS

| | | |
|---|---|---|
| Re. 27,356 | 5/1972 | Russa . |
| 4,026,641 | 5/1977 | Bosserman et al. . |
| 4,563,061 | 1/1986 | Ellis . |
| 4,669,810 | 6/1987 | Wood . |
| 4,775,217 | 10/1988 | Ellis . |
| 4,874,214 | 10/1989 | Cheysson et al. . |
| 5,093,567 | 3/1992 | Staveley . |
| 5,459,612 | 10/1995 | Ingleton ................ 359/630 |
| 5,486,841 | 1/1996 | Hara ..................... 359/462 |

FOREIGN PATENT DOCUMENTS

| | | |
|---|---|---|
| 62-214782 | 9/1987 | Japan . |
| 3-101709 | 4/1991 | Japan . |

*Primary Examiner*—David C. Nelms
*Assistant Examiner*—John P. Cornely
*Attorney, Agent, or Firm*—Cushman, Darby & Cushman IP Group of Pillsbury Madison & Sutro LLP

[57] ABSTRACT

The present invention is an optical apparatus, e.g. an image display apparatus, which enables observation of a clear image at a wide field angle with substantially no reduction in the brightness of the observation image, and which is extremely small in size and light in weight and hence unlikely to cause the observer to be fatigued. The optical apparatus has an image display device (6), and an ocular optical system (7) for leading an image of the image display device (6) to an observer's eyeball (1). The ocular optical system (7) includes, in order from the image side, a third surface (5) which forms an entrance surface, a first surface (3) which forms both a reflecting surface and an exit surface, and a second surface (4) which forms a reflecting surface. The first to third surfaces (3 to 5) are integrally formed with a medium put therebetween which has a refractive index larger than 1. A bundle of light rays emitted from the image display device (6) enters the ocular optical system (7) while being refracted by the third surface (5) and is internally reflected by the first surface (3) and reflected by the second surface (4). Then, the ray bundle is incident on the first surface (3) again and refracted thereby so as to be projected into the observer's eyeball with the observer's iris position or eyeball rolling center as the exit pupil (1).

33 Claims, 15 Drawing Sheets

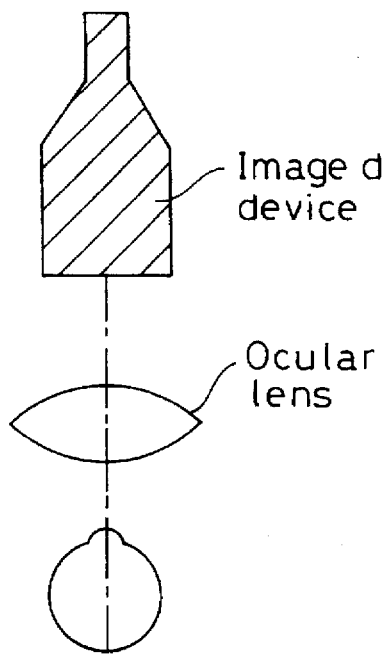
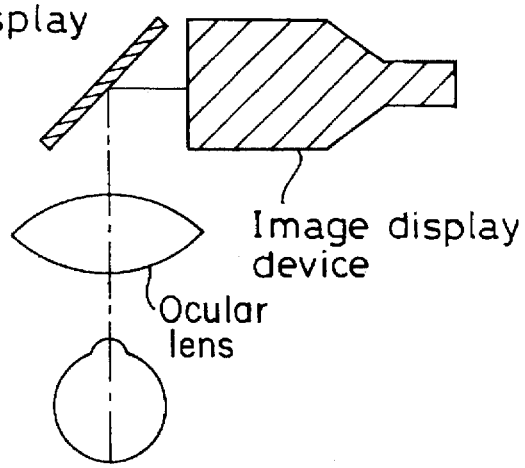
FIG. 21(a)
(PRIOR ART)
FIG. 21(b)
(PRIOR ART)
FIG. 22
(PRIOR ART)
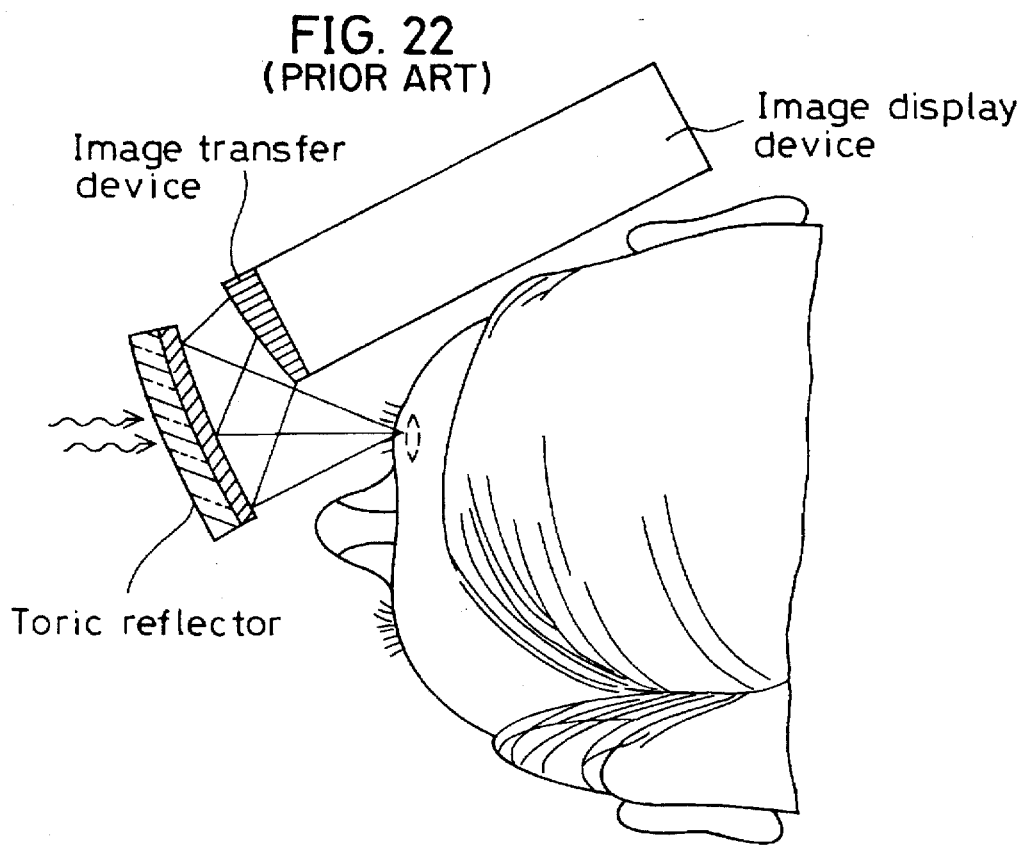

HEAD OR FACE MOUNTED IMAGE DISPLAY APPARATUS

BACKGROUND OF THE INVENTION

The present invention relates to an optical apparatus and, more particularly, to a head- or face-mounted image display apparatus that can be retained on the observer's head or face.

As an example of conventional head- or face-mounted image display apparatus, an image display apparatus disclosed in Japanese Patent Application Unexamined Publication (KOKAI) No. 3-101709 (1991) is known. FIG. 19(a) shows the entire optical system of the conventional image display apparatus, and FIG. 19(b) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of convention image display apparatus. In this apparatus, as shown in FIG. 20, an image of a CRT is transmitted through a relay optical system to form an intermediate image, and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIGS. 21(a) and 21(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 22, an image of an image display device is transferred to a curved object surface by an image transfer device, and the image transferred to the object surface is projected in the air by a toric reflector.

U.S. Reissued Patent No. 27,356 discloses another type of conventional image display apparatus. As shown in FIG. 23, the apparatus is an ocular optical system designed to project an object surface on an exit pupil by a semitransparent concave mirror and a semitransparent plane mirror.

However, an image display apparatus of the type in which an image of an image display device is relayed, as in the image display apparatuses shown in FIGS. 19(a), 19(b) and 20, must use several lenses as a relay optical system in addition to an ocular optical system, regardless of the type of ocular optical system. Consequently, the optical path length increases, and the optical system increases in both size and weight.

In a case where only the ocular optical system shown in FIG. 19(a) is used, since only a reflecting surface having a concave surface directed toward the observer has positive power, as shown in FIG. 19(b), large negative field curvature is produced as shown by reference symbol P1 in the figure.

In a layout such as that shown in FIGS. 21(a) and 21(b), the amount to which the apparatus projects from the observer's face undesirably increases. Further, since an image display device and an illumination optical system are attached to the projecting portion of the apparatus, the apparatus becomes increasingly large in size and heavy in weight.

Since a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head. Further, when the observer moves or turns with the apparatus fitted to his/her head, the apparatus may collide with something.

That is, it is important for a head-mounted image display apparatus to be small in size and light in weight. An essential factor in determining the size and weight of the apparatus is the layout of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 22.

In a coaxial ocular optical system in which an object surface is projected on an observer's pupil by using a semitransparent concave mirror and a semitransparent plane mirror, as shown in FIG. 23, since two semitransparent surfaces are used, the brightness of the image is reduced to as low a level as $1/16$, even in the case of a theoretical value. Further, since field curvature that is produced by the semitransparent concave mirror is corrected by curving the object surface itself, it is difficult to use a flat display, e.g. an LCD (Liquid Crystal Display), as an image display device.

SUMMARY OF THE INVENTION

In view of the above-described problems of the conventional techniques, an object of the present invention is to provide an optical apparatus, e.g. an image display apparatus, which enables observation of a clear image at a wide field angle with substantially no reduction in the brightness of the observation image, and which is extremely small in size and light in weight and hence unlikely to cause the observer to be fatigued.

To attain the above-described object, the present invention provides an optical apparatus which has a device for forming an image to be observed, and an ocular optical system for leading the image to an observer's eyeball. The ocular optical system includes, in order from the image side, a third surface which forms an entrance surface, a first surface which forms both a reflecting surface and an exit surface, and a second surface which forms a reflecting surface. The first to third surfaces are integrally formed with a medium put therebetween which has a refractive index larger than 1.

In this case, the optical apparatus may be used as a finder optical system in which the image forming device is an objective lens system having positive refractive power as a whole and designed to form an object image, and in which the object image is formed in a space between the objective lens system and the ocular optical system. Alternatively, the image forming device may be an image display device for forming an image for observation. In this case, the optical apparatus may have a device for fitting both the image display device and the ocular optical system to the observer's head.

In addition, the present invention provides an optical apparatus which has a device for displaying an image, and an ocular optical system for projecting an image formed by the image display device and for leading the image to an observer's eyeball. The ocular optical system has at least three surfaces, and a space that is formed by these surfaces is filled with a medium having a refractive index larger than 1. The at least three surfaces include, in order from the observer's eyeball side toward the image display device, a first surface serving as both a refracting surface and an internally reflecting surface, a second surface serving as a reflecting surface of positive power which faces the first surface and is decentered or tilted with respect to an observer's visual axis, and a third surface serving as a refracting surface closest to the image display device. At least two of the at least three surfaces have a finite curvature radius.

In addition, the present invention provides an optical apparatus which has a device for displaying an image, and an ocular optical system for projecting an image formed by the image display device and for leading the image to an observer's eyeball. The ocular optical system includes a decentered optical element having at least three surfaces, and a space which is formed by these surfaces is filled with a medium having a refractive index larger than 1. The at least three surfaces include, from the observer's eyeball side toward the image display device, a first surface serving as both a refracting surface and a totally reflecting surface, a second surface serving as a reflecting surface of positive power which faces the first surface and is decentered or tilted with respect to an observer's visual axis, and a third surface serving as a refracting surface closest to the image display device. At least two of the at least three surfaces have a finite curvature radius. The ocular optical system further includes at least one optical surface having refracting action. The decentered optical system and the at least one optical surface are disposed in an optical path which extends from the image display device to the observer's eyeball.

The function of the above-described optical apparatuses of the present invention will be explained below. The following explanation will be made on the basis of backward ray tracing in which light rays are traced from the observer's pupil position toward the image display device for the convenience of designing the optical system in a case where the present invention is used in an image display apparatus.

In the basic arrangement of the present invention, the optical apparatus has a device for forming an image to be observed, and an ocular optical system for leading the image to an observer's eyeball. The ocular optical system includes, in order from the image side, a third surface which forms an entrance surface, a first surface which forms both a reflecting surface and an exit surface, and a second surface which forms a reflecting surface. The first to third surfaces are integrally formed with a medium put therebetween which has a refractive index larger than 1. In backward ray tracing that is carried out from the observer's eyeball side, the sequence of the surface Nos. is as follows: first surface→second surface→first surface→third surface.

The reason for adopting the above-described arrangement will be explained below. If the first to third surface are formed from independent optical elements, since it is demanded to dispose these optical elements with extremely high accuracy in terms of angle, distance, etc., assembly is difficult, and productivity degrades. Therefore, in the present invention, the first to third surfaces are integrally formed (e.g. into a prism), thereby facilitating the assembly operation, and thus enabling an improvement in productivity.

Incidentally, if the optical system is used as a finder optical system in which the image forming device for allowing image-forming rays to enter the ocular optical system comprises an objective lens system having positive refractive power as a whole and designed to form an object image, and in which the object image is formed in a space between the objective lens system and the ocular optical system, the present invention can be used in a single-lens reflex camera, a compact camera in which an observation optical system and a finder optical system are provided separately from each other, an electronic camera in which an electronic imaging device is used in place of film, etc.

Of course, the optical apparatus can be applied to a head-mounted image display apparatus by using an image display device for forming an image for observation as the image forming device, and providing a device for fitting both the image display device and the ocular optical system to the observer's head.

It should be noted that the ocular optical system can also be formed by cementing together a plurality of mediums having different refractive indices which are larger than 1. This is an arrangement in which a cemented surface is added inside a lens (prism) for the purpose of correcting chromatic and other aberrations. By doing so, aberration correction can be realized without interfering with facilitation of assembly.

In the present invention, a space that is formed by the first, second and third surfaces of the ocular optical system is filled with a medium having a refractive index larger than 1, and two of the three surfaces are provided with a finite curvature radius, thereby making it possible to correct spherical aberration, coma and field curvature produced by the second surface, which is decentered or tilted, and thus succeeding in providing the observer clear observation image having a wide exit pupil diameter and a wide field angle.

Concave mirrors generally have such nature that, if strong power is given to the concave surface, the Petzval sum increases, and positive field curvature is produced. In addition, negative comatic aberration is produced. By filling the space formed by the first, second and third surfaces with a medium having a refractive index larger than 1, light rays from the pupil are refracted by the first surface, and it is therefore possible to minimize the height at which extra-axial principal and subordinate rays are incident on the second surface. Thus, since the height of the principal ray is low, the size of the second surface is minimized, and thus the ocular optical system can be formed in a compact structure. Alternatively, the field angle can be widened. Further, since the height of the subordinate rays is reduced, it is possible to minimize comatic aberrations produced by the second surface, particularly higher-order comatic aberrations.

In a case where two of the three surfaces of the ocular optical system have a finite curvature radius, if the first surface has a finite curvature radius in addition to the second surface, and it has positive power, light rays are refracted by the first surface to a large extent. Therefore, the height of light rays incident on the second surface can be further reduced. By this action, it is possible to reduce strong negative comatic aberration produced by the second surface, which is a concave mirror. In a case where the first surface has negative power, it can effectively correct comatic aberration and field curvature which are produced by the second surface when light rays are internally reflected by the first surface after being reflected by the second surface.

In a case where the third surface has a finite curvature radius in addition to the second surface, if the third surface is provided with negative power, it becomes possible to correct field curvature produced by the second surface in particular.

Further, unlike a conventional arrangement in which an observation image of an image display device is formed in the air as a real intermediate image by a relay optical system and projected into an eyeball as an enlarged image by an ocular optical system, the optical apparatus of the present invention is arranged to project the image of the image display device directly into an observer's eyeball as an enlarged image, thereby enabling the observer to see the enlarged image of the image display device as a virtual image. Accordingly, the optical system can be formed from a relatively small number of optical elements. Further, since the second surface of the ocular optical system, which is a reflecting surface, can be disposed immediately in front of the observer's face in a configuration conformable to the curve of his/her face, the amount to which the optical system projects from the observer's face can be reduced to an extremely small value. Thus, a compact and light-weight image display apparatus can be realized.

A very effective way of minimizing the size of the optical element and of improving the performance thereof is to arrange the system so that internal reflection of light rays at the first surface after being reflected by the second surface is total reflection. This will be explained below in detail.

FIGS. 14(a) and 14(b) are sectional views each illustrating an optical ray trace of the optical apparatus according to the present invention. FIG. 14(a) shows an ocular optical system in which a first surface 3 does not totally reflect light rays. FIG. 14(b) shows an ocular optical system in which total reflection occurs at a first surface 3. In these sectional views, reference numeral 1 denotes an observer's pupil position, 2 an observer's visual axis, 3 a first surface of an ocular optical system, 4 a second surface of the ocular optical system, 5 a third surface of the ocular optical system, and 6 an image display device. Reference numeral 7 denotes the ocular optical system having the first, second and third surfaces 3, 4 and 5. In FIG. 14(a), an internally reflecting region M of the first surface 3 has been mirror-coated. The other region of the first surface 3 is a refracting region.

Light rays coming out of the pupil 1 are refracted by the first surface 3 of the ocular optical system, reflected by the second surface 4, which is a concave mirror, and internally reflected by the first surface 3. If, as shown in FIG. 14(a), there is a large difference between the height at which upper extra-axial light rays U are reflected by the second surface 4 and the height at which the upper extra-axial light rays U are reflected by the first surface 3 after being reflected by the second surface 4, the overall length of the ocular optical system 7 correspondingly increases, resulting in an increase of the overall size of the ocular optical system 7. That is, as the difference between the heights of the reflection points decreases, the size of the ocular optical system 7 can be made smaller. In other words, if the size of the ocular optical system is kept constant, as the difference between the heights of the reflection points becomes smaller, the field angle can be widened.

However, if the difference between the reflection heights of the upper extra-axial light rays U at the second surface 4 and the first surface 3 is reduced in the ocular optical system of the present invention, as shown in FIG. 14(b), the upper light rays U are reflected at a position higher than a position at which lower extra-axial light rays L are incident on the first surface 3. Accordingly, when the first surface 3 is not a totally reflecting surface, the refracting region of the first surface 3 overlaps the mirror coat region M'. Consequently, the lower light rays L are undesirably blocked.

That is, if the internal reflection at the first surface 3 satisfies the condition for total reflection, the first surface 3 need not be mirror-coated. Therefore, even if the upper light rays U after reflection at the second surface 4 and the lower light rays L incident on the first surface 3 interfere with each other at the first surface 3, the upper and lower light rays U and L can perform their original functions.

At the second surface 4, which is a decentered concave mirror, as the reflection angle becomes larger, comatic aberration occurs to a larger extent. However, in a case where light rays are totally reflected by the first surface 3, the angle of reflection at the second surface 4 can be reduced. Therefore, it is possible to effectively suppress the occurrence of comatic aberration at the second surface 4.

It should be noted that, when the internal reflection at the first surface 3 does not satisfy the condition for total reflection, the internally reflection region M of the first surface 3 needs to be mirror-coated.

Further, an effective way of correcting aberration is to form any one of the first, second and third surfaces of the ocular optical system into a decentered aspherical surface.

The above is an important condition for correcting comatic aberrations, particularly higher-order comatic aberrations and coma flare, produced by the second surface, which is decentered in a direction Y in a coordinate system (X, Y, Z), described later, or tilted with respect to the visual axis.

In an image display apparatus which uses an ocular optical system of the type having a decentered or tilted reflecting surface in front of an observer's eyeball as in the present invention, light rays are obliquely incident on the reflecting surface even on the observer's visual axis. Therefore, comatic aberration is produced. The comatic aberration increases as the inclination angle of the reflecting surface becomes larger. However, if it is intended to realize a compact and wide-field image display apparatus, it is difficult to ensure an observation image having a wide field angle unless the amount of eccentricity (decentration) or the angle of inclination is increased to a certain extent because of the interference between the observer's head and the optical path, or between the image display device and the optical path. Accordingly, as the field angle of an image display apparatus becomes wider and the size thereof becomes smaller, the inclination angle of the reflecting surface becomes larger. As a result, how to correct comatic aberration becomes a serious problem.

To correct such complicated comatic aberration, any one of the first, second and third surfaces constituting the ocular optical system is formed into a decentered aspherical surface. By doing so, the power of the optical system can be made asymmetric with respect to the visual axis. Further, the effect of the aspherical surface can be utilized for off-axis aberration. Accordingly, it becomes possible to effectively correct comatic aberrations, including axial aberration.

Further, it is important that any one of the first, second and third surfaces of the ocular optical system should be an anamorphic surface. That is, any one of the three surfaces should be a surface in which the curvature radius in the YZ-plane and the curvature radius in the XZ-plane, which perpendicularly intersects the YZ-plane, are different from each other.

The above is a condition for correcting aberration which occurs because the second surface is decentered or tilted with respect to the visual axis. In general, if a spherical surface is decentered, the curvature relative to light rays incident on the surface in the plane of incidence and that in a plane perpendicularly intersecting the incidence plane differ from each other. Therefore, in an ocular optical system where a reflecting surface is disposed in front of an observer's eyeball in such a manner as to be decentered or tilted with respect to the visual axis as in the present invention, an image on the visual axis lying in the center of the observation image is also astigmatically aberrated for the reason stated above. In order to correct the axial astigmatism, it is important that any one of the first, second and third surfaces of the ocular optical system should be formed so that the curvature radius in the plane of incidence and that in a plane perpendicularly intersecting the incidence plane are different from each other.

Incidentally, in a case where a vertical plane containing an observer's visual axis is defined as YZ-plane, and a horizontal plane containing the observer's visual axis is defined as XZ-plane, it is preferable to satisfy the following condition:

$$0.5 < R_{y2}/R_{x2} < 5 \quad (1)$$

where $R_{y2}$ is the curvature radius of the second surface in the YZ-plane (i.e. the curvature radius of a surface intersecting a straight light (visual axis) which is an extension of the principal ray extending from the observer's pupil in the vicinity of the intersection), and $R_{x2}$ is the curvature radius of the second surface in the XZ-plane (i.e. the curvature radius of a surface intersecting a straight line (visual axis) which is an extension of the principal ray extending from the observer's pupil in the vicinity of the intersection).

The above expression (1) is a condition for correcting aberrations, particularly axial and other astigmatic aberrations. In general, as the field angle becomes larger, higher-order astigmatic aberrations appear. In a convex lens system, as the field angle becomes larger, the meridional image increases in the negative direction, whereas the sagittal image increases in the positive direction. In order to correct these astigmatic aberrations, it is necessary to arrange the optical system such that the power in the meridional plane (i.e. a cross-section taken in a direction parallel to the plane of the figure) is reduced, whereas the power in the sagittal plane (i.e. a cross-section taken in a direction perpendicular to the plane of the figure) is increased. Accordingly, with regard to the curvature radius in one plane, the curvature radius should be increased in the direction Y and reduced in the direction X.

If the value of $R_{y2}/R_{x2}$ falls outside the range of the condition (1), the degree of difference between the focus position of a ray bundle in a cross-section taken in a direction perpendicular to the plane of the figure and the focus position of a ray bundle in a cross-section taken in a direction parallel to the plane of the figure becomes excessively large beyond the observer's tolerance, making it exceedingly difficult for the observer to see an image sent from the image display device. That is, if the value of $R_{y2}/R_{x2}$ is not smaller than the upper value, i.e. 5, the focal length at the focus position of the ray bundle in the cross-section taken in a direction parallel to the plane of the figure becomes excessively longer than that at the focus position of the ray bundle in the cross-section taken in a direction perpendicular to the plane of the figure. If the value of $R_{y2}/R_{x2}$ is not larger than the lower limit, i.e. 0.5, the focal length at the focus position of the ray bundle in the cross-section taken in a direction parallel to the plane of the figure becomes excessively shorter than that at the focus position of the ray bundle in the cross-section taken in a direction perpendicular to the plane of the figure.

With regard to the lower limit of the condition (1), it is even more desirable to set $R_{y2}/R_{x2}$ to a value not less than 1 (i.e. $1 \leq R_{y2}/R_{x2}$). By doing so, it is possible for the observer to see a clearer image of the image display device. With regard to the upper limit of the condition (1), it is even more desirable to set $R_{y2}/R_{x2}$ to a value not larger than 2 (i.e. $R_{y2}/R_{x2} \leq 2$). By doing so, it is possible for the observer to see a clearer image of the image display device.

In the ocular optical system of the present invention, a principal surface having positive power is the second surface, which is a reflecting surface. Therefore, it is preferable for the second surface to satisfy the condition (1) rather than for another surface to have a difference between the curvature radii in the YZ- and XZ-planes. That is, astigmatism correction can be made even more effective by allowing the second surface to satisfy the condition (1). This is preferable in terms of aberration correction.

Incidentally, an effective way of correcting aberration is to form the first surface into a transparent reflecting surface having a convex surface directed toward the second surface. Since the second surface is a principal reflecting surface having positive power in the whole ocular optical system, it produces field curvature to a considerable extent in addition to the above-described comatic aberration. The negative comatic aberration produced by the second surface can be corrected by allowing the first surface to have negative power so that the first surface produces comatic aberration which is opposite in sign to the comatic aberration produced by the second surface. The positive field curvature produced by the second surface can be simultaneously corrected by producing negative field curvature at the third surface.

It is also preferable to satisfy the following condition:

$$-10 < r_1/r_2 < 10 \quad (2)$$

where $r_1$ is the curvature radius of the first surface of the ocular optical system in the vicinity of an intersection between the observer's visual axis and the first surface, and $r_2$ is the curvature radius of the second surface of the ocular optical system in the vicinity of an intersection between the observer's visual axis and the second surface.

It should be noted that $r_1$ and $r_2$ are curvature radii measured in the same cross-section as in the case of the above $R_{y2}$ (i.e. curvature radii in the plane of the figure).

The above expression (2) is a condition for suppressing the occurrence of field curvature by adjusting the curvature radii of the first and second surfaces on the observer's visual axis. If the value of $r_1/r_2$ in the condition (2) is not larger than the lower limit, i.e. −10, Petzval sum increases toward the negative side, causing positive field curvature. If the value of $r_1/r_2$ in the condition (2) is not smaller than the upper limit, i.e. 10, Petzval sum increases toward the positive side, causing negative field curvature. It is even more desirable to define the upper limit of the condition (2) as a value smaller than 5 (i.e. $r_1/r_2 < 5$). By doing so, the aberration performance can be further improved. Further, it is even more desirable to define the lower limit of the condition (2) as a value larger than −5 (i.e. $-5 < r_1/r_2$). By doing so, the aberration performance can be further improved.

In order to allow the first surface to perform total reflection as internal reflection, it is necessary to satisfy the condition that reflection angles of all light rays at the first surface are not smaller than the critical angle $\theta_r = \sin^{-1}(1/n)$ (where n is the refractive index of a medium constituting the optical system). In the case of n=1.5, for example, $\theta_r$=41.81, and a reflection angle not smaller than it is necessary. This will be explained below with reference to FIGS. 15(a) and 15(b).

FIGS. 15(a) and 15(b) show a part of the ocular optical system in which light rays are first reflected by the second surface 4 and then internally reflected by the first surface 3. FIG. 15(a) shows the way in which reflection takes place when the first surface 3 is concave toward the second surface 4. FIG. 15(b) shows the way in which reflection takes place when the first surface 3 is convex toward the second surface 4.

After being reflected by the second surface 4, each light ray is directed downward at a certain reflection angle. In a case where the first surface 3 is a reflecting surface having a concave surface directed toward the second surface 4, as shown in FIG. 15(a), lines S normal to the first surface 3 convergently extend toward the second surface 4. Since a lower light ray L reflected by the second surface 4 is incident on the first surface 3 in a direction along the line normal to the first surface 3, the reflection angle $\gamma$ at the first surface 3 cannot be made large. That is, it is difficult to satisfy the condition for total reflection with respect to all light rays reflected by the first surface 3. Conversely, in a case where the first surface 3 is convex toward the second surface 4, as shown in FIG. 15(b), lines S' normal to the first surface 3 divergently extend toward the second surface 4. Accordingly, the reflection angle $\gamma'$ can be effectively increased even for the lower light ray. Thus, the condition for total reflection at the first surface 3 can be readily satisfied at a wide field angle.

Further, it is desirable for either one of the first and third surfaces of the ocular optical system to be tilted or decentered with respect to the visual axis. By tilting or decentering either one of the first and third surfaces, it becomes possible to correct comatic aberrations asymmetrically introduced into an image which lies closer to the image display device as viewed from the visual axis and into an image which lies on the opposite side, and also possible to dispose the image display device on a plane which is approximately perpendicular to the optical axis reflected by the second surface. This is effective when an image display device which is inferior in viewing angle characteristics is used.

It is preferable to satisfy the following condition:

$$10° \leq \alpha \leq 40° \qquad (3)$$

where $\alpha$ is the angle between the visual axis 2 and the line normal to the second surface 4 of the ocular optical system in the vicinity of an intersection between the visual axis 2 and the second surface 4.

This is a condition for disposing the ocular optical system and the image display device 6 of the image display apparatus according to the present invention at appropriate positions. If the angle $\alpha$ is smaller than the lower limit of the condition (3), i.e. 10°, the degree of inclination of the second surface 4 becomes excessively small, so that a bundle of light rays totally reflected by the first surface 3 is undesirably shifted downward of the visual axis 2 after being reflected by the second surface 4. Consequently, light is incident on the lower side of the observer's pupil 1, and thus it becomes impossible to observe the image of the image display device 6 from the pupil 1. If the observer forcefully shifts the pupil 1 downwardly in this state to see the image of the image display device 6, aberrations in the plus and minus directions which are produced when light rays are reflected by the first and second surfaces 3 and 4 become incapable of canceling each other with good balance. As a result, a distorted image is undesirably observed, and thus the performance is deteriorated. Conversely, if the angle $\alpha$ exceeds the upper limit of the condition (3), i.e. 40°, the degree of inclination of the second surface 4 becomes excessively large, so that a bundle of light rays totally reflected by the first surface 3 is undesirably shifted upward of the visual axis 2 after being reflected by the second surface 4. Consequently, light is incident on the upper side of the observer's pupil 1, and thus it becomes impossible to observe the image of the image display device 6 from the pupil 1. If the observer forcefully shifts the pupil 1 upwardly in this state to see the image of the image display device 6, aberrations in the plus and minus directions which are produced when light rays are reflected by the first and second surfaces 3 and 4 become incapable of canceling each other with good balance. As a result, a distorted image is undesirably observed, and thus the performance is deteriorated in the same way as the above.

In order to achieve an even more effective layout, it is preferable to define the lower limit for $\alpha$ as 20° or more. This is true of the upper limit of the condition (3). That is, an even more effective layout is achieved by defining the upper limit for $\alpha$ as 30° or less.

Further, it is important that the display surface of the image display device should be tilted with respect to the visual axis. In a case where a refracting surface or a reflecting surface which constitutes an optical element is decentered or tilted, the refraction or reflection angle of light rays from the pupil at the refracting or reflecting surface may vary according to the image height, causing the image surface to be tilted with respect to the visual axis. In such a case, the inclination of the image surface can be corrected by tilting the display surface of the image display device with respect to the visual axis.

Incidentally, as the field angle of an image display apparatus widens and the size thereof decreases, the inclination angle of the second surface, which is the first reflecting surface, increases, and higher-order comatic aberrations produced thereby increase. Further, astigmatism that is produced by the inclination of the surface also increases. Accordingly, it may be difficult to satisfactorily correct these aberrations by only the decentered optical element in which a space formed by at least three surfaces is filled with a medium having a refractive index larger than 1, and in which at least two of the at least three surfaces have a finite curvature radius.

Therefore, at least one optical surface having refracting action is disposed, in addition to the above-described decentered optical element, between the observer's eyeball and the image display device, thereby making it possible to correct aberrations produced in the ocular optical system even more effectively.

In the decentered optical element of the present invention, the second surface and the internally reflecting surface of the first surface, which is subsequent to the second surface, are reflecting surfaces. Therefore, no chromatic aberration is produced at these surfaces. Further, at the third surface, which lies in close proximity to the image display device, the principal ray is approximately parallel to the optical axis. Therefore, the third surface produces minimal chromatic aberration. Consequently, chromatic aberration produced by the first surface serving as a refracting surface is dominant in the ocular optical system. Further, in a wide-field optical system such as that in the present invention, lateral chromatic aberration appears more markedly than axial chromatic aberration. That is, it is important to correct lateral chromatic aberration produced by the first surface, and it is possible to display an image which is clearer and of higher resolution by correcting the lateral chromatic aberration. Accordingly, the ocular optical system is preferably arranged such that the decentered optical element, together with at least one optical surface having refracting action, is disposed between the observer's eyeball and the image display device. By doing so, optical elements constituting the ocular optical system can be composed of two or more different mediums, and it becomes possible to correct the lateral chromatic aberration by virtue of the difference in Abbe's number between these mediums.

As has been described above, ocular important in the ocular optical system of the present invention to correct chromatic aberration produced by the first surface of the decentered optical element. The chromatic aberration can be corrected by forming the above-described at least one optical surface having refracting action from a surface which produces chromatic aberration which is approximately equal in quantity but opposite in sign to the chromatic aberration produced by the first surface.

The correction of chromatic aberration will be explained below more specifically. By disposing the decentered optical element and at least one optical surface having refracting action in the optical path extending from the image display device to the observer's eyeball, the ocular optical system can be composed of two or more different mediums. In this case, lateral chromatic aberration can be corrected by virtue of the Abbe's number difference between the different mediums. For instance, let us consider a case where the optical surface is disposed between the first and second surfaces of the decentered optical element, and the decentered optical element is composed of two different mediums. Achromatic conditions for the entire optical system are given by $$f_1 = (v_1 - v_2) \times f/v_1$$
$$f_2 = -(v_1 - v_2) \times f/v_2$$
$$1/f = 1/f_1 + 1/f_2$$

where f is the focal length of the entire optical system, $f_1$ is the focal length of the first surface-side decentered optical element, $v_1$ is the Abbe's number of the first surface-side decentered optical element, $f_2$ is the focal length of the second surface-side decentered optical element, and $v_2$ is the Abbe's number of the second surface-side decentered optical element.

The focal length f of the ocular optical system and the focal length $f_2$ of the second surface-side decentered optical element are positive, and the focal length $f_1$ of the first surface-side decentered optical element is negative. Hence, the relationship between the Abbe's numbers of the first and second surface-side decentered optical elements is given by $v_1 < v_2$. That is, by using a medium having a smaller Abbe's number to form the first surface-side decentered optical element, chromatic aberration can be effectively corrected.

In a case where at least one optical surface is present at a position other than the above, Abbe's numbers of the mediums can be set in the same manner as in the above-described example.

In a case where the above-described at least one optical surface is disposed between the observer's eyeball and the first surface of the decentered optical element, and the optical surface has positive refractive power, the beam diameter at the second surface of the decentered optical element becomes small, and hence higher-order comatic aberrations reduce. Therefore, it is possible to observe a clear image as far as the edges of the display surface of the image display device. Further, since a principal ray at the edge of the image is refracted by the at least one optical surface having positive refractive power, the height of the ray incident on the decentered optical system can be reduced. Therefore, it becomes possible to set a larger field angle than in a case where the decentered optical system alone is used.

In a case where the above-described at least one optical surface is disposed between the first and second surfaces of the decentered optical element, the decentered optical element is divided into first and second surface-side portions which are composed of two different mediums, as has been described above; this is useful to correct chromatic aberration.

In a case where the above-described at least one optical surface is disposed between the third surface of the decentered optical element and the image display device, if the optical surface has negative power, since the position of the optical surface is closest to the image display device, it is possible to correct field curvature produced by the decentered optical element.

By decentering the above-described at least one optical surface with respect to the visual axis, it is possible to correct comatic aberrations asymmetrically introduced into an image which lies closer to the image display device as viewed from the visual axis and into an image which lies on the opposite side, and also possible to allow the optical axis to lie approximately perpendicular to a plane on which the image display device is disposed.

By using a cemented lens to form the above-described at least one optical surface, lateral chromatic aberration produced in the decentered optical system can be corrected; this is useful to ensure a clearer image and a wider field angle.

By forming the above-described at least one optical surface and the surface of the decentered optical element that faces the optical surface into concave surfaces, an air lens is formed. In this case, since the negative powers of the two surfaces can be effectively utilized, Petzval sum in the entire optical system can be minimized. Thus, field curvature produced by the second surface of the decentered optical element can be effectively corrected.

It should be noted that it becomes possible for the observer to see a stable observation image by providing a device for positioning both the image display device and the ocular optical system with respect to the observer's head.

By allowing both the image display device and the ocular optical system to be fitted to the observer's head with a supporting device, it becomes possible for the observer to see the observation image in a desired posture and from a desired direction.

Further, it becomes possible for the observer to see the observation image with both eyes without fatigue by providing a device for supporting at least two optical apparatuses at a predetermined spacing. Further, if images with a disparity therebetween are displayed on the right and left image display surfaces, and these images are observed with both eyes, it is possible to enjoy viewing a stereoscopic image.

Further, if the optical apparatus is arranged to form an image of an object at infinity with the image display device surface in the ocular optical system defined as an image surface, the optical apparatus can be used as an imaging optical system, e.g. a finder optical system for a camera such as that shown in FIGS. 17 and 18.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 21(a) and 21(b) show the optical system of still another conventional image display apparatus.

FIG. 22 shows the optical system of a further conventional image display apparatus.

DESCRIPTION OF THE PREFERRED EMBODIMENTS

Examples 1 to 13 in which the optical apparatus of the present invention is applied to an image display apparatus will be described below with reference to FIGS. 1 to 13, which are sectional views of image display apparatuses designed for a single eye according to Examples 1 to 13.

Figure 1:
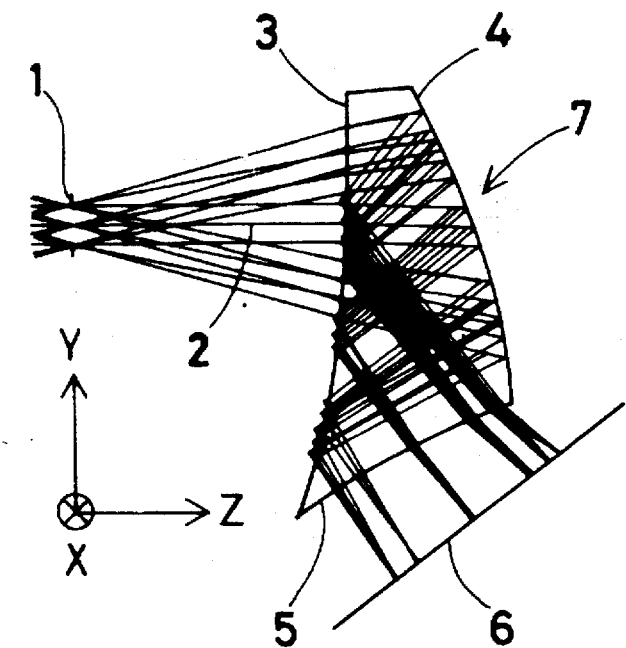
FIG. 1 illustrates an optical ray trace of Example 1 in which the optical apparatus of the present invention is applied to an image display apparatus.

Constituent parameters of each example will be shown later. In the following description, the parameter numbers are shown as ordinal numbers in backward tracing from an observer's pupil position 1 toward an image display device 6. A coordinate system is defined as follows: As shown in FIG. 1, with the observer's iris position 1 defined as the origin, the direction of an observer's visual axis 2 is taken as Z-axis, where the direction toward an ocular optical system 7 from the origin is defined as positive direction, and the vertical direction (as viewed from the observer's eyeball) which perpendicularly intersects the observer's visual axis 2 is taken as Y-axis, where the upward direction is defined as position direction. Further, the horizontal direction (as viewed from the observer's eyeball) which perpendicularly intersects the observer's visual axis 2 is taken as X-axis, where the leftward direction is defined as positive direction. That is, the plane of the figure is defined as YZ-plane, and a plane which is perpendicular to the plane of the figure is defined as XZ-plane. The optical axis is bent in the YZ-plane, which is parallel to the plane of the figure.

In the constituent parameters (shown later), regarding each surface for which eccentricities Y and Z and inclination angle $\theta$ are shown, the eccentricity Y is a distance by which the vertex of the surface decenters in the Y-axis direction from the parameter number 1 (pupil position 1), which is the reference surface, and the eccentricity Z is a distance by which the vertex of the surface decenters in the Z-axis direction from the parameter number 1. The inclination angle $\theta$ is the angle of inclination of the central axis of the surface from the Z-axis. In this case, positive $\theta$ means counterclockwise rotation. It should be noted that a surface without indication of eccentricities Y, Z and inclination angle $\theta$ is coaxial with respect to the preceding surface.

Regarding surface separations, the surface separation of the surface 3 of parameter number 2 is the distance from the surface 1 of parameter number 1 along the Z-axis direction, and a point on the surface 3 that lies on the Z-axis is defined as a reference point. A point which decenters from the reference point in the direction Y by the given eccentricity is the vertex of the surface 3 of parameter number 2. Regarding the coaxial portion, the surface separation is the axial distance from the surface concerned to the next surface. It should be noted that surface separations are shown with the direction of backward tracing along the optical axis defined as positive direction.

The non-rotationally symmetric aspherical configuration of each surface may be expressed in the coordinate system defining the surface as follows:

$$Z = [(X^2/R_x) + (Y^2/R_y)]/[1 + \{1 - (1 + K_x)(X^2/R_x^2) -$$
$$(1 + K_y)(Y^2/R_y^2)\}^{1/2}] + AR[(1 - AP)X^2 + (1 + AP)Y^2]^2 +$$
$$BR[(1 - BP)X^2 + (1 + BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

The rotationally symmetric aspherical configuration of each surface may be expressed by.

$$Z=\{(h^2/R)/[1+\{1-(1+K)(h^2/R^2)\}^{1/2}]\}+Ah^4+Bh^6$$

where R is the paraxial curvature radius; K is the conical coefficient; A and B are 4th- and 6th-order aspherical coefficients, respectively; and h is $h^2=X^2+Y^2$.

It should be noted that the refractive index of the medium between a pair of surfaces is expressed by the refractive index for the spectral d-line. Lengths are given in millimeters.

The following examples are all image display apparatuses for the right eye. An image display apparatus for the left eye can be realized by disposing the constituent optical elements of each example in symmetrical relation to the apparatus for the right eye with respect to the YZ-plane.

In an actual apparatus, needless to say, the direction in which the optical axis is bent by the ocular optical system may be any of the upward, downward and sideward directions of the observer.

In each sectional view, reference numeral 1 denotes an observer's pupil position, 2 an observer's visual axis, 3 a first surface of an ocular optical system, 4 a second surface of the ocular optical system, 5 a third surface of the ocular optical system, and 6 an image display device. Reference numeral 7 denotes the ocular optical system having the first, second and third surfaces 3, 4 and 5. Reference numeral 9 denotes an optical surface.

The actual path of light rays in each example is as follows: In Example 1, for instance, a bundle of light rays emitted from the image display device 6 enters the ocular optical system 7 while being refracted by the third surface 5 of the ocular optical system 7 and is internally reflected by the first surface 3 and reflected by the second surface 4. Then, the ray bundle is incident on the first surface 3 again and refracted thereby so as to be projected into the observer's eyeball with the observer's iris position or eyeball rolling center as the exit pupil 1.

EXAMPLE 1

In this example, as shown in the sectional view of FIG. 1, the horizontal field angle is 40°, while the vertical field angle is 30.6°, and the pupil diameter is 4 millimeters. In the constituent parameters (shown later), the parameter numbers 2, 3 and 4 correspond to anamorphic aspherical surfaces 3, 4 and 3, respectively, and the parameter number 5 is a spherical surface 5.

EXAMPLE 2

Figure 2:
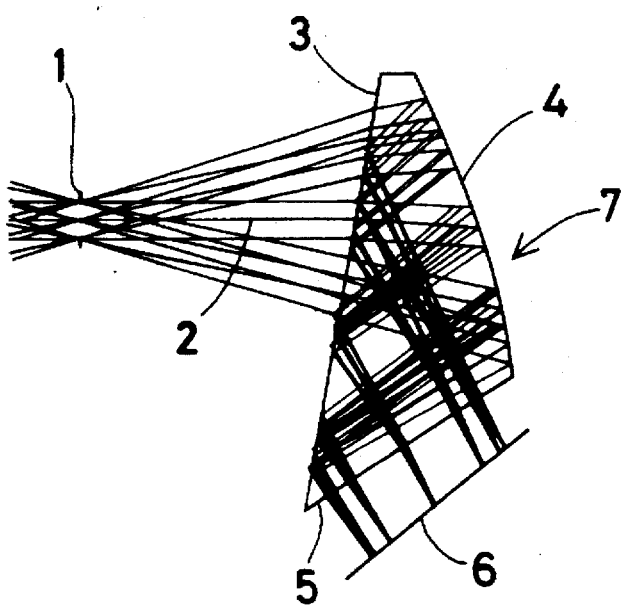
FIG. 2 illustrates an optical ray trace of Example 2 in which the optical apparatus of the present invention is applied to an image display apparatus.

In this example, as shown in the sectional view of FIG. 2, the horizontal field angle is 45°, while the vertical field angle is 34.5°, and the pupil diameter is 4 millimeters. In the constituent parameters (shown later), the parameter numbers 2, 3 and 4 correspond to anamorphic aspherical surfaces 3, 4 and 3 respectively, and the parameter number 5 is a flat surface 5.

EXAMPLE 3

Figure 3:
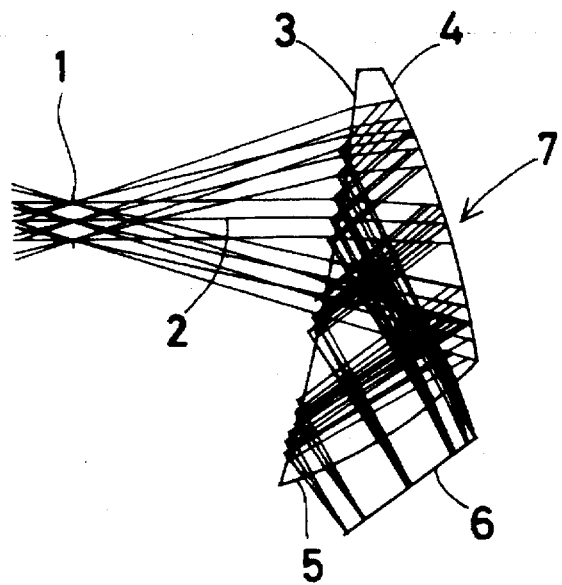
FIG. 3 illustrates an optical ray trace of Example 3 in which the optical apparatus of the present invention is applied to an image display apparatus.

In this example, as shown in the sectional view of FIG. 3, the horizontal field angle is 45°, while the vertical field angle is 34.5°, and the pupil diameter is 4 millimeters. In the constituent parameters (shown later), the parameter numbers 2, 3, 4 and 5 correspond to anamorphic aspherical surfaces 3, 4, 3, 5, respectively.

EXAMPLE 4

Figure 4:
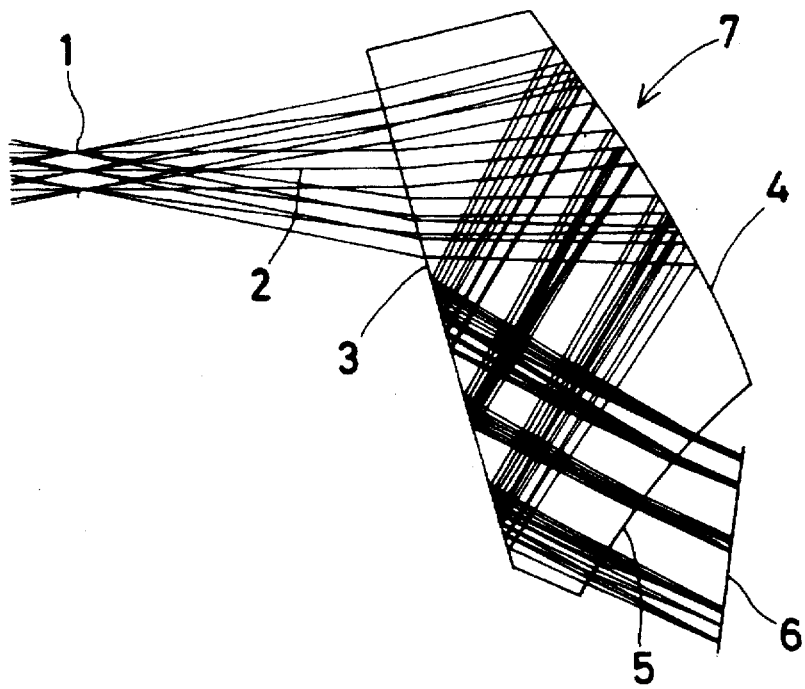
FIG. 4 illustrates an optical ray trace of Example 4 in which the optical apparatus of the present invention is applied to an image display apparatus.

In this example, as shown in the sectional view of FIG. 4, the horizontal field angle is 30°, while the vertical field angle is 22.7°, and the pupil diameter is 4 millimeters. In the constituent parameters (shown later), the parameter number 3 is an anamorphic aspherical surface 4, the parameter numbers 2 and 4 are flat surfaces 3, and the parameter number 5 is a spherical surface 5.

EXAMPLE 5

Figure 5:
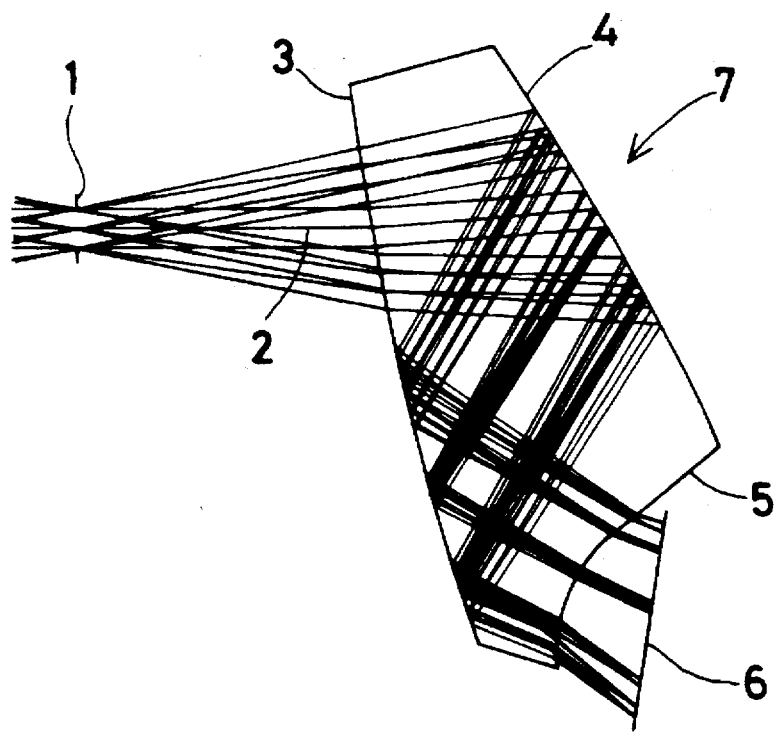
FIG. 5 illustrates an optical ray trace of Example 5 in which the optical apparatus of the present invention is applied to an image display apparatus.

In this example, as shown in the sectional view of FIG. 5, the horizontal field angle is 30°, while the vertical field angle is 22.7°, and the pupil diameter is 4 millimeters. In the constituent parameters (shown later), the numbers 3 and 5 correspond to anamorphic aspherical surfaces 4 and 5, and the parameter numbers 2 and 4 correspond to spherical surfaces 3.

EXAMPLE 6

Figure 6:
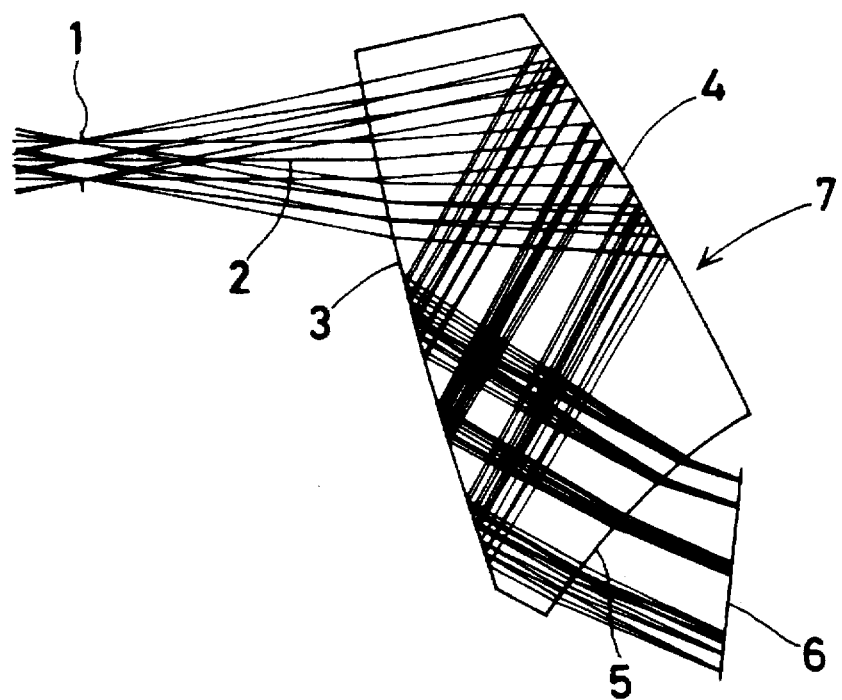
FIG. 6 illustrates an optical ray trace of Example 6 in which the optical apparatus of the present invention is applied to an image display apparatus.

In this example, as shown in the sectional view of FIG. 6, the horizontal field angle is 30°, while the vertical field angle is 22.7°, and the pupil diameter is 4 millimeters. In the constituent parameters (shown later), the parameter number 3 is for anamorphic aspherical surface 4, and the parameter numbers 2, 4 and 5 correspond to spherical surfaces 3, 3, and 5, respectively.

EXAMPLE 7

Figure 7:
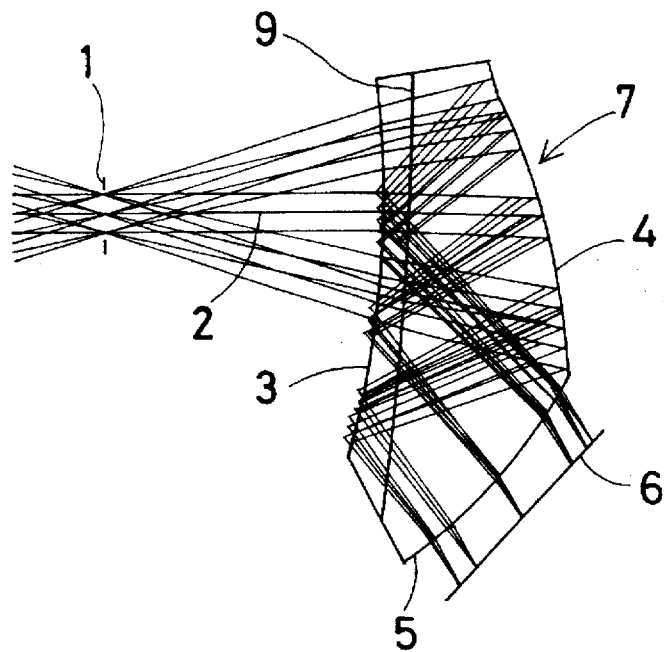
FIG. 7 illustrates an optical ray trace of Example 7 in which the optical apparatus of the present invention is applied to an image display apparatus.

In this example, as shown in the sectional view of FIG. 7, the horizontal field angle is 45°, while the vertical field angle is 34.5°, and the pupil diameter is 4 millimeters. In the constituent parameters (shown later), the parameter numbers 2, 3, 5, 6 and 7 correspond to spherical surfaces 3, 9, 9, 3, 9, the parameter number 4 is an anamorphic aspheric surface 4, and the parameter number 8 is a rotationally symmetrical aspherical surface 5. The optical surface 9 is defined by the parameter Nos. 3, 5 and 7, which are respectively disposed between the surfaces 3 and 4 surfaces 3 and 4 (parameter numbers 2 and 4), between the 4 and 3 (parameter numbers 4 and 6) and between the parameter numbers 6 and 8 of the ocular optical system (decentered optical element) 7. The optical surface 9 is decentered with respect to the visual axis.

EXAMPLE 8

Figure 8:
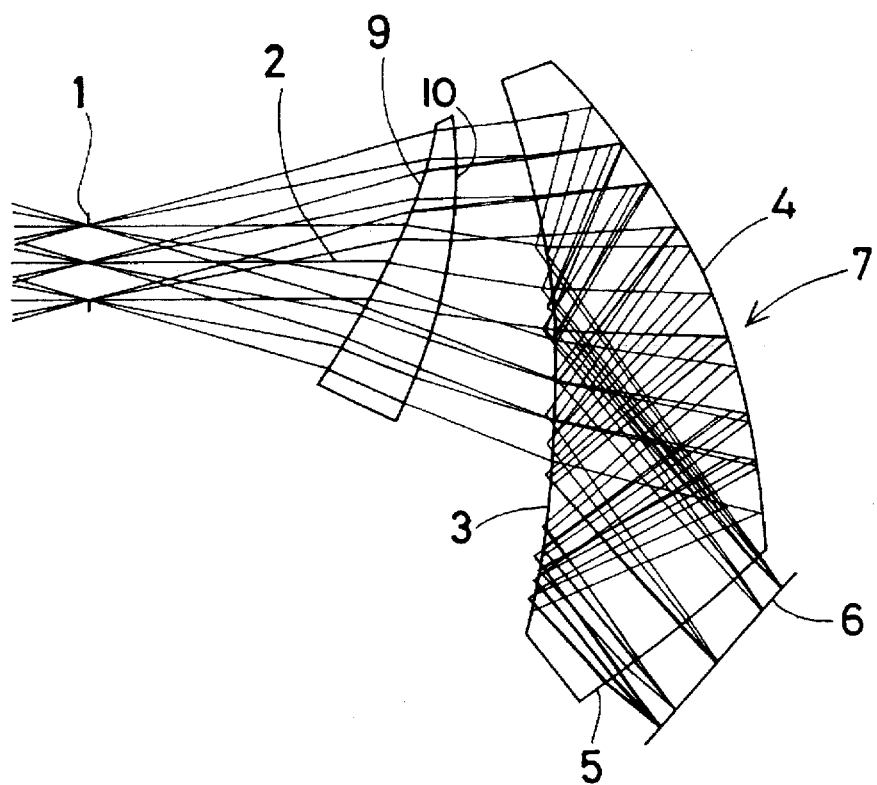
FIG. 8 illustrates an optical ray trace of Example 8 in which the optical apparatus of the present invention is applied to an image display apparatus.

In this example, as shown in the sectional view of FIG. 8, the horizontal field angle is 40°, while the vertical field angle is 30.5°, and the pupil diameter is 8 millimeters. In the constituent parameters (shown later), the parameter numbers 2, 3, 4, 6 and 7 correspond to spherical surfaces, and the parameter number 5 is an anamorphic aspherical surface 4.

The optical surfaces 9 and 10 are formed from a positive lens which is defined by the parameter numbers 2 and 3, respectively. The positive lens is disposed between the ocular optical system (decentered optical element) 7 and the observer's eyeball in such a manner as to be decentered with respect to the visual axis.

EXAMPLE 9

Figure 9:
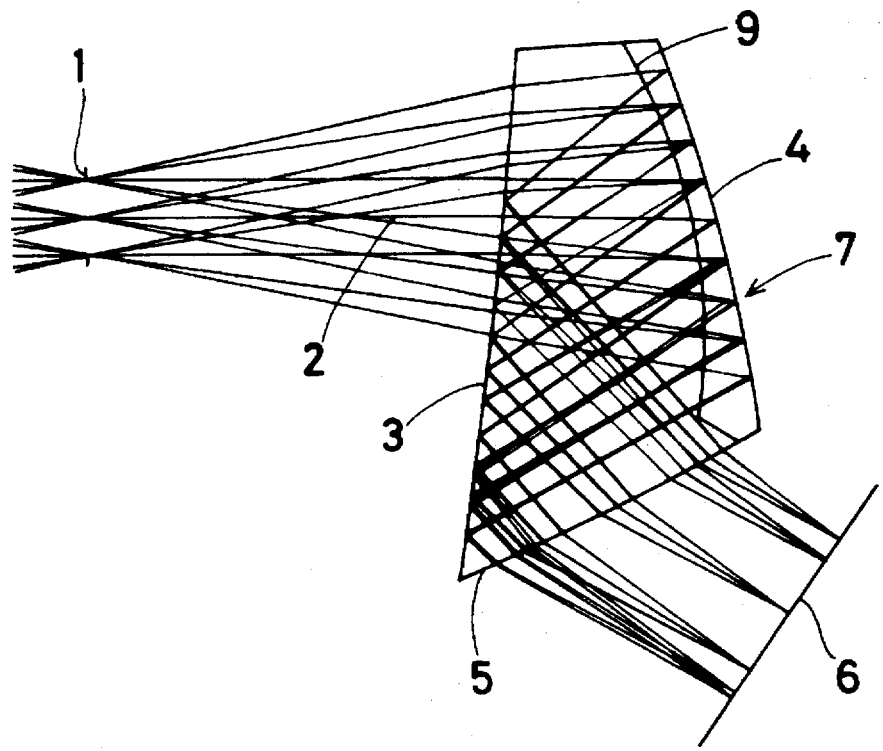
FIG. 9 illustrates an optical ray trace of Example 9 in which the optical apparatus of the present invention is applied to an image display apparatus.

In this example, as shown in the sectional view of FIG. 9, the horizontal field angle is 30°, while the vertical field angle is 22.7°, and the pupil diameter is 8 millimeters. In the constituent parameters (shown later), the parameter numbers 3, 5 and 7 correspond to spherical surfaces 9, 9 and 5, and the parameter numbers 2, 4 and 6 correspond to anamorphic aspherical surfaces 3, 4 and 3. The optical surface 9 is defined by the parameter numbers 3 and 5, which are respectively disposed between the surfaces corresponding parameter numbers 2 and 4 and between the surfaces of parameter numbers 4 and 6 of the ocular optical system (decentered optical element) 7. The optical surface 9 is decentered with respect to the visual axis.

EXAMPLE 10

Figure 10:
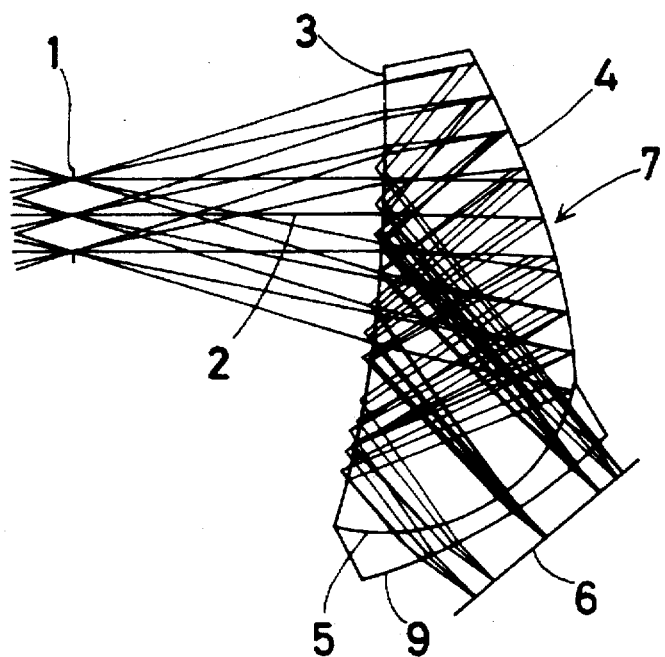
FIG. 10 illustrates an optical ray trace of Example 10 in which the optical apparatus of the present invention is applied to an image display apparatus.

In this example, as shown in the sectional view of FIG. 10, the horizontal field angle is 45°, while the vertical field angle is 34.5°, and the pupil diameter is 8 millimeters. In the constituent parameters (shown later), the parameter numbers 5 and 6 correspond to spherical surfaces 5 and 9, and the parameter numbers 2, 3 and 4 are anamorphic aspherical surfaces 3, 4 and 3. The optical surface 9 is defined by the parameter number 6. The optical surface 9 is cemented to the ocular optical system (decentered optical system) 7 so as to form a negative lens in cooperation with the parameter number 5 of the ocular optical system 7. The optical surface 9 is decentered with respect to the visual axis.

EXAMPLE 11

Figure 11:
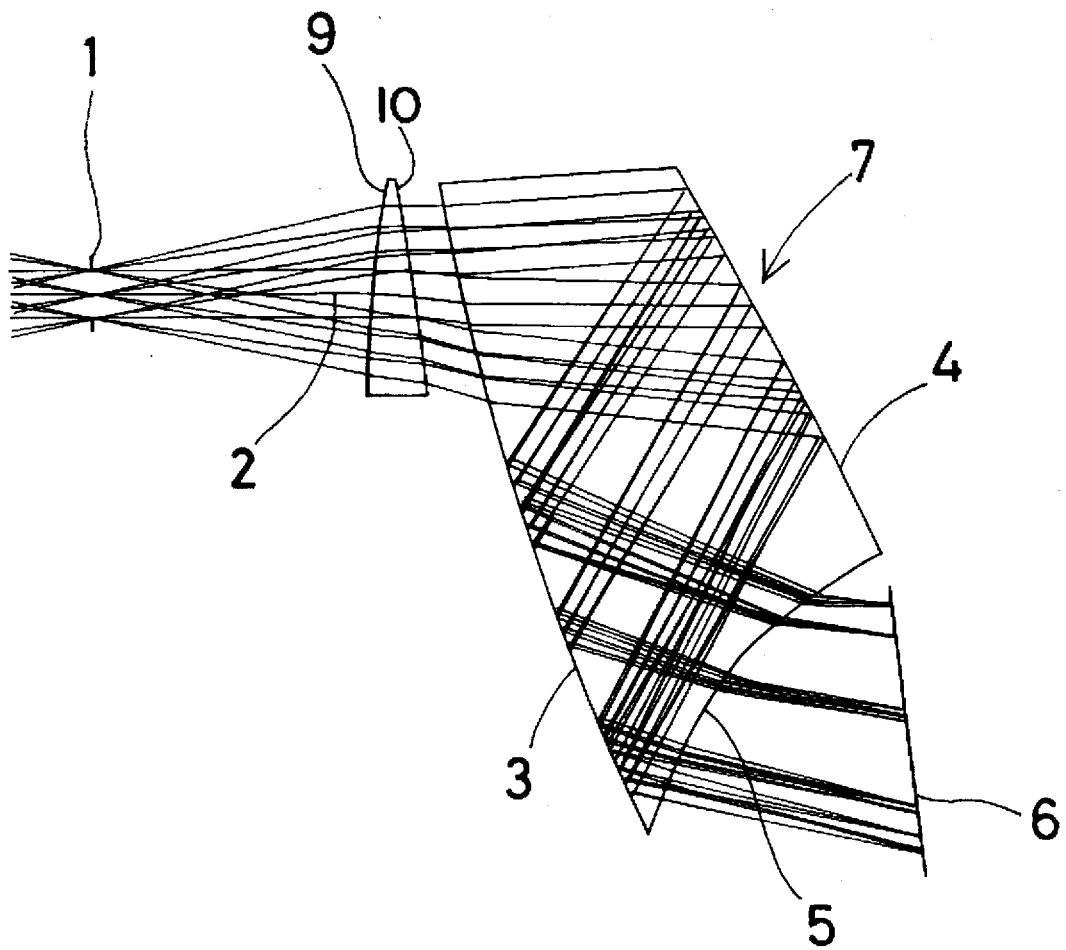
FIG. 11 illustrates an optical ray trace of Example 11 in which the optical apparatus of the present invention is applied to an image display apparatus.

In this example, as shown in the sectional view of FIG. 11, the horizontal field angle is 30°, while the vertical field angle is 22.7°, and the pupil diameter is 4 millimeters. In the constituent parameters (shown later), the parameter numbers 2, 3, 4, 6 and 7 correspond to spherical surfaces, and the parameter number 5 is an anamorphic aspherical surface 4. The optical surfaces 9 and 10 are formed from a positive lens which is defined by the parameter numbers 2 and 3 respectively. The positive lens is disposed between the ocular optical system (decentered optical element) 7 and the observer's eyeball in such a manner as to be decentered with respect to the visual axis.

EXAMPLE 12

In this example, as shown in the sectional view of FIG. 12, an optical element 8 providing see-through function (hereinafter referred to as "see-through optical element 8) is cemented to the outside world side of the optical system 7 in Example 1 described above. The optical system in this example is arranged to have substantially no refractive power as a whole with respect to a bundle of light rays from the outside world. Thus, an outside world image can be clearly observed. The second surface 4 to which the see-through optical element 8 is cemented in this example is formed from a semitransparent surface which reflects a ray bundle from the image display device 6, and which transmits light from the outside world.

Figure 12:
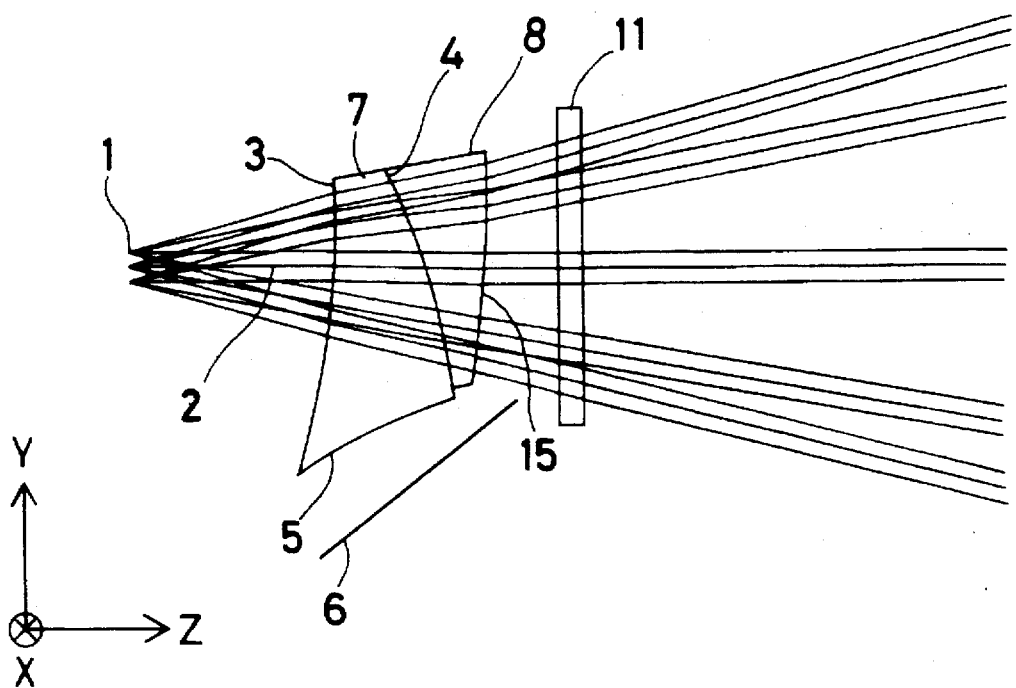
FIG. 12 illustrates an optical ray trace of Example 12 in which the optical apparatus of the present invention is applied to an image display apparatus.

Further, by providing a liquid crystal shutter 11 at the outer side of the see-through optical element 8, as shown in FIG. 12, three different observation conditions can be realized: When an image of the image display device 6 is to be observed, it is viewed with the liquid crystal shutter 11 closed. When an outside world image alone is to be observed, the liquid crystal shutter 11 is opened, and the image display device 6 is turned off. When the image display device 6 is turned on to display an image with the liquid crystal shutter 11 open, an outside world image can be observed superimposed on an electronic image.

Constituent parameters in the above-described see-through condition will be shown later. Since the optical path from an LCD as the image display device 6 is the same as that in Example 1, description thereof is omitted.

In the constituent parameters (shown later), values at the refracting surfaces with respect to a bundle of light rays from the outside world in front of the observer's eyeball are shown. The values at the refracting surfaces are also shown in the sequence of the refracting surface 3 to the refracting surface 4 to the refracting surface 15, in backward ray tracing from the exit pupil 1 in the same way as in the other examples. It should be noted that the configuration of the surface 15 of the see-through optical element 8 on which outside world light is incident is made the same as the configuration of the first surface 3 of the ocular optical system 7, and that the surface of the see-through optical element 8 from which the outside world light emanates is made the same as the configuration of the second surface 4 of the ocular optical system 7.

EXAMPLE 13

Figure 13:
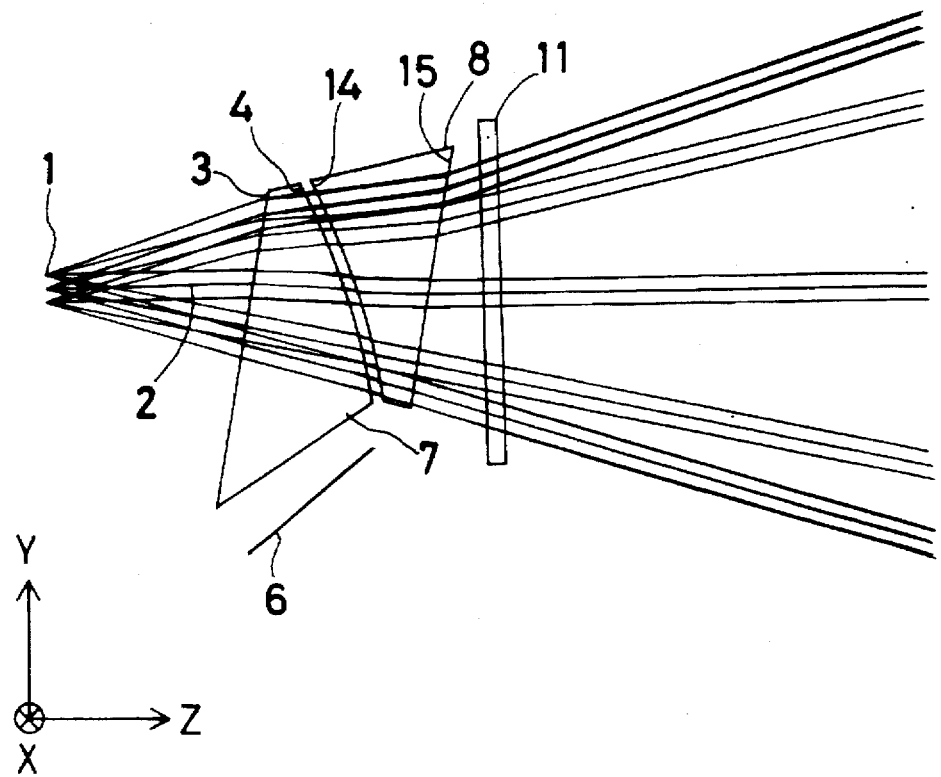
FIG. 13 illustrates an optical ray trace of Example 13 in which the optical apparatus of the present invention is applied to an image display apparatus.
Figure 14:
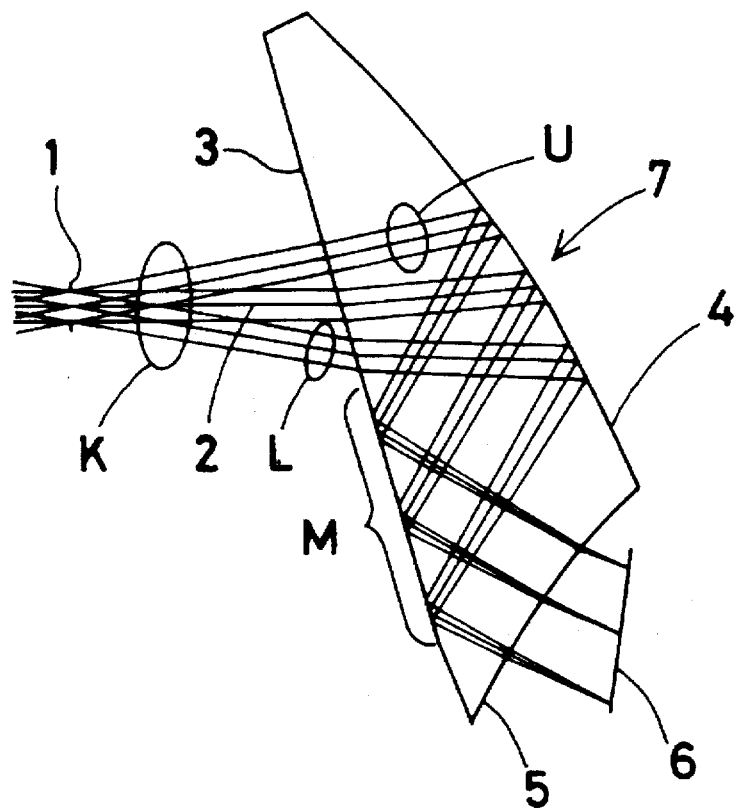
FIGS. 14(a) and 14(b) are views used to explain internal reflection at a first surface of the optical apparatus according to the present invention.
Figure 14:
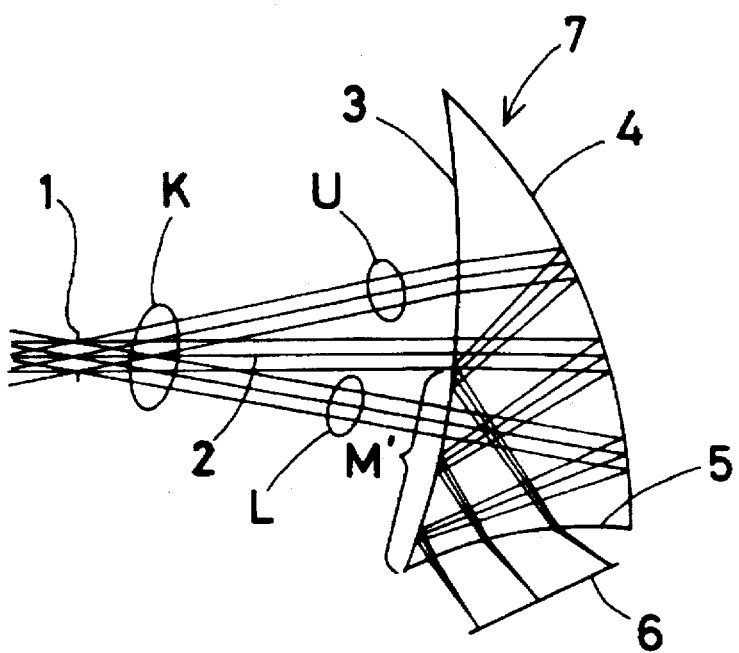
Figure 15:
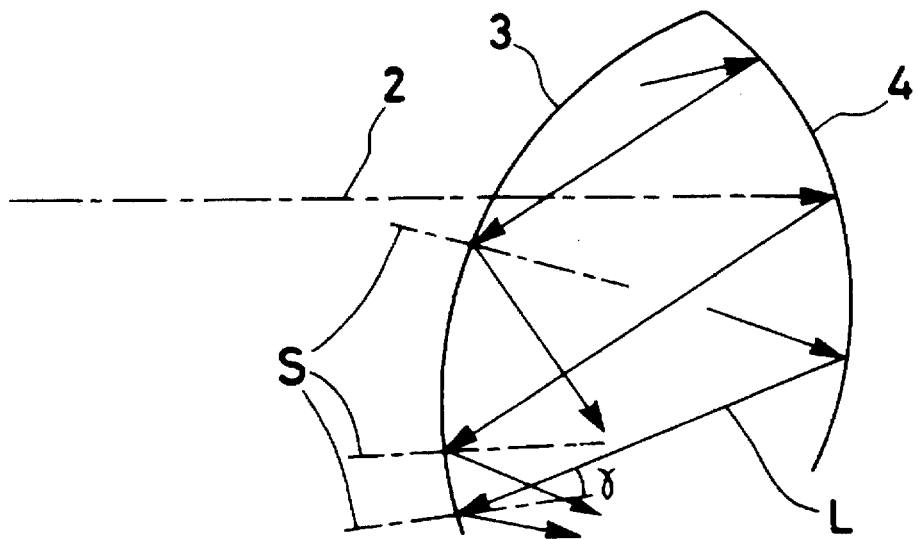
FIGS. 15(a) and 15(b) are views used to explain the relationship between total reflection and the configuration of the first surface of the optical apparatus according to the present invention.
Figure 15:
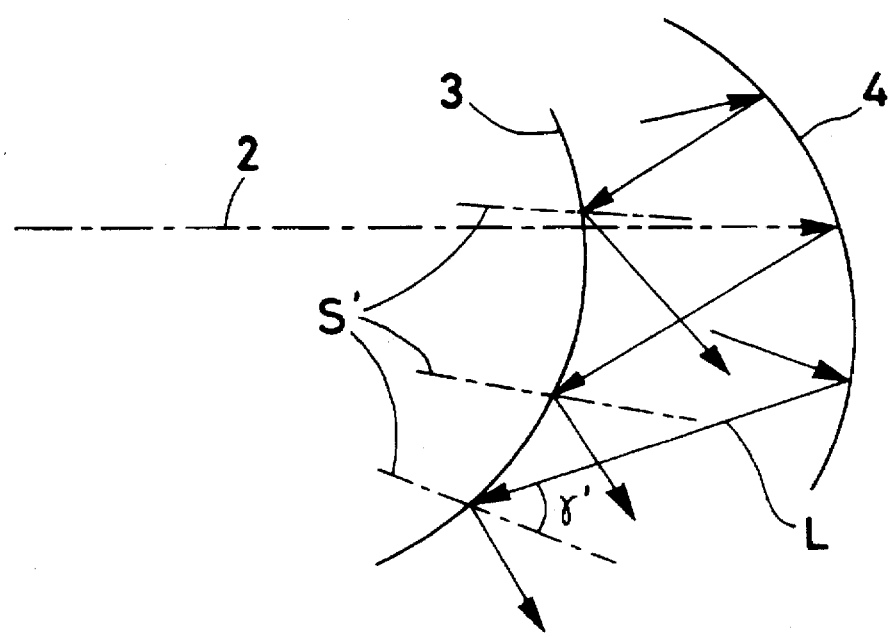

In this example, as shown in the sectional view of FIG. 13, an optical element 8 for providing see-through function is disposed at the outside world side of the optical system 7 in the above-described Example 2 with a very narrow air spacing provided therebetween. In this example also, the optical system is arranged to have substantially no refractive power with respect to a bundle of light rays from the outside world, in the same way as in Example 12. Thus, an outside world image can be clearly observed. The second surface 4 is formed from a semitransparent surface which reflects a ray bundle from the image display device 6, and which transmits light from the outside world. Further, a liquid crystal shutter 11 is disposed at the outer side of the see-through optical element 8.

By virtue of the above-described arrangement, three different observation conditions can be realized in the same way as in Example 12.

Constituent parameters in the above-described see-through condition will be shown later. Since the optical path from an LCD as the image display device 6 is the same as that in Example 2, description thereof is omitted.

In the constituent parameters (shown later), values at the refracting surfaces with respect to a bundle of light rays from the outside world in front of the observer's eyeball are shown. The values at the refracting surfaces are also shown in the sequence of the refracting surface 3 to the refracting surface 4 to the refracting surface 14 to the refracting surface 15, in backward ray tracing from the exit pupil 1 in the same way as in the other examples. It should be noted that the configuration of the surface 15 of the see-through optical element 8 on which outside world light is incident is made the same as the configuration of the first surface 3 of the ocular optical system 7, and that the surface 14 of the see-through optical element 8 from which the outside world light emanates is made the same as the configuration of the second surface 4 of the ocular optical system 7.

Although in Examples 12 and 13 a prism having curved surfaces decentered with respect to the visual axis is provided as a see-through optical element at the outside world side of the ocular optical system of the present invention in order to allow excellent see-through observation by the ocular optical system, it is also possible to use a Fresnel or other lens, an optical element having a diffraction optical surface, etc.

Constituent parameters of the above-described Examples 1 to 13 will be shown below.

EXAMPLE 1

| Parameter No. | | Radius of curvature | Surface separation | | Refractive index (Eccentricity) | | Abbe's No. (Inclination angle) |
|---|---|---|---|---|---|---|---|
| 1 | | ∞ (pupil) | 26.360 | | | | |
| 2 | $R_y$ | −108.187 | | | 1.4922 | | 57.50 |
|   | $R_x$ | −73.105 | | Y | −24.028 | θ | −14.70° |
|   | $K_y$ | 0 | | | | | |
|   | $K_x$ | 0 | | | | | |
|   | AR | $5.54186 \times 10^{-7}$ | | | | | |
|   | BR | $8.17563 \times 10^{-11}$ | | | | | |
|   | AP | −0.0804376 | | | | | |
|   | BP | −1.37947 | | | | | |
| 3 | $R_y$ | −69.871 | | | 1.4922 | | 57.50 |
|   | $R_x$ | −60.374 | | Y | 19.109 | θ | 36.66° |
|   | $K_y$ | −0.136826 | | Z | 33.339 | | |
|   | $K_x$ | −0.123306 | | | | | |
|   | AR | $-7.23291 \times 10^{-11}$ | | | | | |
|   | BR | $-4.52937 \times 10^{-12}$ | | | | | |
|   | AP | 29.0752 | | | | | |
|   | BP | −2.08536 | | | | | |
| 4 | $R_y$ | −108.187 | | | 1.4922 | | 57.50 |
|   | $R_x$ | −73.105 | | Y | −24.028 | θ | −14.70° |
|   | $K_y$ | 0 | | Z | 26.360 | | |
|   | $K_x$ | 0 | | | | | |
|   | AR | $5.54186 \times 10^{-7}$ | | | | | |
|   | BR | $8.17563 \times 10^{-11}$ | | | | | |
|   | AP | −0.0804376 | | | | | |
|   | BP | −1.37947 | | | | | |
| 5 | | 77.772 | | Y | −35.215 | θ | −47.77° |
|   | | | | Z | 18.817 | | |
| 6 | | (display device) | | (from No. 1 surface) | | | |
|   | | | | Y | −30.892 | θ | −52.77° |
|   | | | | Z | 43.084 | | |

(1) $R_{y2}/R_{x2} = 1.157$
(2) $r_1/r_2 = 1.55$
(3) $\alpha = 53.34°$

EXAMPLE 2

| Parameter No. | | Radius of curvature | Surface separation | | Refractive index (Eccentricity) | | Abbe's No. (Inclination angle) |
|---|---|---|---|---|---|---|---|
| 1 | | ∞ (pupil) | 20.267 | | | | |
| 2 | $R_y$ | −420.378 | | | 1.4922 | | 57.50 |
|   | $R_x$ | −99.789 | | Y | −49.262 | θ | −13.94° |
|   | $K_y$ | 5.709616 | | | | | |
|   | $K_x$ | −2.785007 | | | | | |
|   | AR | $5.37533 \times 10^{-7}$ | | | | | |
|   | BR | $-6.41106 \times 10^{-11}$ | | | | | |
|   | AP | −0.422753 | | | | | |
|   | BP | −0.455912 | | | | | |
| 3 | $R_y$ | −122.291 | | | 1.4922 | | 57.50 |
|   | $R_x$ | −69.335 | | Y | −34.556 | θ | 37.99° |
|   | $K_y$ | 0.774787 | | Z | 24.367 | | |
|   | $K_x$ | −0.104426 | | | | | |

EXAMPLE 2-continued

| Parameter No. | | Radius of curvature | Surface separation | | Refractive index (Eccentricity) | | Abbe's No. (Inclination angle) |
|---|---|---|---|---|---|---|---|
| | AR | $-1.82945 \times 10^{-9}$ | | | | | |
| | BR | $4.45272 \times 10^{-14}$ | | | | | |
| | AP | 5.40431 | | | | | |
| | BP | $-1.13468$ | | | | | |
| 4 | $R_y$ | $-420.378$ | | | 1.4922 | | 57.50 |
| | $R_x$ | $-99.789$ | | Y | $-49.262$ | θ | $-13.94°$ |
| | $K_y$ | 5.709616 | | Z | 20.267 | | |
| | $K_x$ | $-2.785007$ | | | | | |
| | AR | $5.37533 \times 10^{-7}$ | | | | | |
| | BR | $-6.41106 \times 10^{-11}$ | | | | | |
| | AP | $-0.422753$ | | | | | |
| | BP | $-0.455912$ | | | | | |
| 5 | | ∞ | | Y | $-33.816$ | θ | $-56.84°$ |
| | | | | Z | 21.726 | | |
| 6 | | (display device) | | Y | $-31.165$ | θ | $-50.91°$ |
| | | | | Z | 38.433 | | |

(1) $R_{y2}/R_{x2} = 1.764$
(2) $r_1/r_2 = 3.44$
(3) $\alpha = 52.01°$

EXAMPLE 3

| Parameter No. | | Radius of curvature | Surface separation | | Refractive index (Eccentricity) | | Abbe's No. (Inclination angle) |
|---|---|---|---|---|---|---|---|
| 1 | | ∞ (pupil) | 19.657 | | | | |
| 2 | $R_y$ | $-178.469$ | | | 1.4922 | | 57.50 |
| | $R_x$ | $-75.710$ | | Y | $-42.983$ | θ | $-19.56°$ |
| | $K_y$ | $-4.700072$ | | | | | |
| | $K_x$ | $-1.222689$ | | | | | |
| | AR | $9.71232 \times 10^{-7}$ | | | | | |
| | BR | $-1.79187 \times 10^{-10}$ | | | | | |
| | AP | $-0.426826$ | | | | | |
| | BP | $-0.380615$ | | | | | |
| 3 | $R_y$ | $-81.632$ | | | 1.4922 | | 57.50 |
| | $R_x$ | $-66.826$ | | Y | 30.011 | θ | $40.46°$ |
| | $K_y$ | $-0.070545$ | | Z | 26.362 | | |
| | $K_x$ | $-0.574123$ | | | | | |
| | AR | $3.9081 \times 10^{-11}$ | | | | | |
| | BR | $-2.95604 \times 10^{-14}$ | | | | | |
| | AP | $-62.1044$ | | | | | |
| | BP | 3.68602 | | | | | |
| 4 | $R_y$ | $-178.469$ | | | 1.4922 | | 57.50 |
| | $R_x$ | $-75.710$ | | Y | $-42.983$ | θ | $-19.56°$ |
| | $K_y$ | $-4.700072$ | | Z | 19.657 | | |
| | $K_x$ | $-1.222689$ | | | | | |
| | AR | $9.71232 \times 10^{-7}$ | | | | | |
| | BR | $-1.79187 \times 10^{-10}$ | | | | | |
| | AP | $-0.426826$ | | | | | |
| | BP | $-0.380615$ | | | | | |
| 5 | $R_y$ | $-78.809$ | | Y | $-28.629$ | θ | $-69.21$ |
| | $R_x$ | $-15.80$ | | Z | 27.051 | | |
| | $K_y$ | $-12.000$ | | | | | |
| | $K_x$ | $-7.201382$ | | | | | |
| | AR | $9.38885 \times 10^{-7}$ | | | | | |
| | BR | $3.46619 \times 10^{-9}$ | | | | | |
| | AP | $-0.995315$ | | | | | |
| | BP | 0.706461 | | | | | |
| 6 | | (display device) | | Y | $-30.077$ | θ | $-55.73°$ |
| | | | | Z | 38.578 | | |

(1) $R_{y2}/R_{x2} = 1.222$
(2) $r_1/r_2 = 2.19$
(3) $\alpha = 49.54°$

EXAMPLE 4

| Parameter No. | | Radius of curvature | Surface separation | | Refractive index (Eccentricity) | | Abbe's No. (Inclination angle) |
|---|---|---|---|---|---|---|---|
| 1 | | ∞ (pupil) | 35.674 | | | | |
| 2 | | ∞ | | | 1.4870 | | 70.40 |
| | | | | Y | 4.942 | θ | 15.45° |
| 3 | $R_y$ | −166.785 | | | 1.4870 | | 70.40 |
| | $R_x$ | −129.798 | | Y | −2.361 | θ | 30.67° |
| | $K_y$ | 0.644353 | | Z | 64.642 | | |
| | $K_x$ | −3.574565 | | | | | |
| | AR | $-1.34076 \times 10^{-7}$ | | | | | |
| | BR | $-6.16761 \times 10^{-13}$ | | | | | |
| | AP | −0.140999 | | | | | |
| | BP | −6.05079 | | | | | |
| 4 | | ∞ | | | 1.4870 | | 70.40 |
| | | | | Y | 4.942 | θ | 15.45° |
| | | | | Z | 35.674 | | |
| 5 | | 92.827 | | Y | −21.834 | θ | −50.80° |
| | | | | Z | 78.827 | | |
| 6 | | (display device) | | Y | −44.030 | θ | −8.14° |
| | | | | Z | 74.025 | | |

(1) $R_{y2}/R_{x2} = 1.285$
(2) $r_1/r_2 = -0.60$
(3) $\alpha = 59.33°$

EXAMPLE 5

| Parameter No. | | Radius of curvature | Surface separation | | Refractive index (Eccentricity) | | Abbe's No. (Inclination angle) |
|---|---|---|---|---|---|---|---|
| 1 | | ∞ (pupil) | 32.614 | | | | |
| 2 | | 359.756 | | | 1.4870 | | 70.40 |
| | | | | Y | 2.346 | θ | 9.84° |
| 3 | $R_y$ | −173.440 | | | 1.4870 | | 70.40 |
| | $R_x$ | −140.501 | | Y | −1.857 | θ | 29.87° |
| | $K_y$ | −8.751468 | | Z | 58.946 | | |
| | $K_x$ | 4.994003 | | | | | |
| | AR | $2.50178 \times 10^{-8}$ | | | | | |
| | BR | $-1.79281 \times 10^{-14}$ | | | | | |
| | AP | −3.8616 | | | | | |
| | BP | 23.172 | | | | | |
| 4 | | 359.756 | | | 1.4870 | | 70.40 |
| | | | | Y | 2.346 | θ | 9.84° |
| | | | | Z | 32.614 | | |
| 5 | $R_y$ | −71.035 | | Y | −28.993 | θ | −50.31° |
| | $R_x$ | −30.258 | | Z | 64.366 | | |
| | $K_y$ | 0 | | | | | |
| | $K_x$ | −4.016232 | | | | | |
| | AR | $1.64494 \times 10^{-5}$ | | | | | |
| | BR | $-6.89738 \times 10^{-9}$ | | | | | |
| | AP | 0.757293 | | | | | |
| | BP | −0.0405894 | | | | | |
| 6 | | (display device) | | Y | −42.040 | θ | −9.06° |
| | | | | Z | 63.493 | | |

(1) $R_{y2}/R_{x2} = 1.234$
(2) $r_1/r_2 = -2.07$
(3) $\alpha = 60.13°$

EXAMPLE 6

| Parameter No. | Radius of curvature | | Surface separation | | Refractive index (Eccentricity) | | Abbe's No. (Inclination angle) |
|---|---|---|---|---|---|---|---|
| 1 | ∞ (pupil) | | 31.861 | | | | |
| 2 | 624.447 | | | | 1.4870 | | 70.40° |
| | | | Y | 4.081 | | θ | 12.08° |
| 3 | $R_y$ | −205.155 | | | 1.4870 | | 70.40 |
| | $R_x$ | −147.117 | Y | −0.579 | | θ | 31.42° |
| | $K_y$ | 5.070131 | Z | 59.565 | | | |
| | $K_x$ | −2.741334 | | | | | |
| | AR | $-9.17885 \times 10^{-9}$ | | | | | |
| | BR | $-4.90794 \times 10^{-13}$ | | | | | |
| | AP | 0.353607 | | | | | |
| | BP | −8.4008 | | | | | |
| 4 | 624.447 | | | | 1.4870 | | 70.40 |
| | | | Y | 4.081 | | θ | 12.08° |
| | | | Z | 31.861 | | | |
| 5 | 62.779 | | Y | −30.891 | | θ | −54.73° |
| | | | Z | 69.696 | | | |
| 6 | (display device) | | Y | −46.009 | | θ | −6.40° |
| | | | Z | 71.400 | | | |

(1) $R_{y2}/R_{x2} = 1.395$
(2) $r_1/r_2 = -3.04$
(3) $\alpha = 58.58°$

EXAMPLE 7

| Parameter No. | Radius of curvature | | Surface separation | | Refractive index (Eccentricity) | | Abbe's No. (Inclination angle) |
|---|---|---|---|---|---|---|---|
| 1 | ∞(pupil) | | 25.798 | | | | |
| 2 | −96.979 | | | | 1.7550 | | 27.60 |
| | | | Y | 35.503 | | θ | 19.41° |
| 3 | −371.916 | | | | 1.7184 | | 46.86 |
| | | | Y | 28.466 | | θ | 1.64° |
| | | | Z | 34.179 | | | |
| 4 | $R_y$ | −73.443 | | | 1.7184 | | 46.86 |
| | $R_x$ | −69.804 | Y | −27.105 | | θ | −5.80° |
| | $K_y$ | 0.36532 | Z | 50.843 | | | |
| | $K_x$ | −0.017813 | | | | | |
| | AR | $2.37314 \times 10^{-10}$ | | | | | |
| | BR | $3.61091 \times 10^{-12}$ | | | | | |
| | AP | −8.04115 | | | | | |
| | BP | 0.142633 | | | | | |
| 5 | −371.916 | | | | 1.7550 | | 27.60 |
| | | | Y | 28.466 | | θ | 1.64° |
| | | | Z | 34.179 | | | |
| 6 | −96.979 | | | | 1.7550 | | 27.60 |
| | | | Y | 35.503 | | θ | 19.41° |
| | | | Z | 25.789 | | | |
| 7 | −371.916 | | | | 1.7184 | | 46.86 |
| | | | Y | 28.466 | | θ | 1.64° |
| | | | Z | 34.171 | | | |
| 8 | R | −64.000 | Y | −5.065 | | θ | −14.73° |
| | K | 0.032998 | Z | 55.928 | | | |
| | A | $-2.03599 \times 10^{-6}$ | | | | | |
| | B | $8.44986 \times 10^{-10}$ | | | | | |
| 9 | (display device) | | Y | −32.487 | | θ | −42.92° |
| | | | Z | 46.354 | | | |

(1) $R_{y2}/R_{x2} = 1.052$
(3) $\alpha = 95.80°$

EXAMPLE 8

| Parameter No. | Radius of curvature | | Surface separation | | Refractive index (Eccentricity) | | Abbe's No. (Inclination angle) |
|---|---|---|---|---|---|---|---|
| 1 | ∞(pupil) | | 5.434 | | | | |
| 2 | −67.198 | | 12.671 | | 1.4870 | | 70.40 |
| | | | Y | −28.840 | | θ | −62.14° |

EXAMPLE 8-continued

| Parameter No. | Radius of curvature | | Surface separation | | Refractive index (Eccentricity) | | Abbe's No. (Inclination angle) |
|---|---|---|---|---|---|---|---|
| 3 | −55.775 | | | | | | |
| 4 | −108.280 | | | | 1.7095 | | 47.70 |
| | | | Y | 23.401 | | θ | 20.84° |
| | | | Z | 45.112 | | | |
| 5 | $R_y$ | −81.008 | | | 1.7095 | | 47.70 |
| | $R_x$ | −76.504 | Y | −20.800 | | θ | 9.41° |
| | $K_y$ | 0.596647 | Z | 73.513 | | | |
| | $K_x$ | 0.2904 | | | | | |
| | AR | $6.598 \times 10^{-8}$ | | | | | |
| | BR | $7.20621 \times 10^{-12}$ | | | | | |
| | AP | −0.0350833 | | | | | |
| | BP | −0.148558 | | | | | |
| 6 | −108.280 | | | | 1.7095 | | 47.70 |
| | | | Y | 23.401 | | θ | 20.84° |
| | | | Z | 45.112 | | | |
| 7 | −168.220 | | Y | −4.594 | | θ | −33.61° |
| | | | Z | 96.768 | | | |
| 8 | (display device) | | Y | −44.345 | | θ | −40.19° |
| | | | Z | 69.067 | | | |

(1) $R_{y2}/R_{x2} = 1.059$
(2) $r_1/r_2 = 1.34$
(3) $\alpha = 80.59°$

EXAMPLE 9

| Parameter No. | Radius of curvature | | Surface separation | | Refractive index (Eccentricity) | | Abbe's No. (Inclination angle) |
|---|---|---|---|---|---|---|---|
| 1 | ∞(pupil) | | 44.607 | | | | |
| 2 | $R_y$ | −735.371 | | | 1.6792 | | 51.00 |
| | $R_x$ | ∞ | Y | −18.782 | | θ | −7.75° |
| | $K_y$ | 0 | | | | | |
| | $K_x$ | 0 | | | | | |
| | AR | $1.57554 \times 10^{-8}$ | | | | | |
| | BR | $9.32392 \times 10^{-14}$ | | | | | |
| | AP | −1.67996 | | | | | |
| | BP | 0.122856 | | | | | |
| 3 | −61.610 | | | | 1.6682 | | 32.23 |
| | | | Y | 18.019 | | θ | 29.91° |
| | | | Z | 60.673 | | | |

EXAMPLE 9-continued

| Parameter No. | | Radius of curvature | Surface separation | Refractive index (Eccentricity) | Abbe's No. (Inclination angle) |
|---|---|---|---|---|---|
| 4 | $R_y$ | −151.581 | | 1.6682 | 32.23 |
|   | $R_x$ | −170.090 | | Y 23.479 | θ 23.76° |
|   | $K_y$ | −8.127909 | | Z 62.324 | |
|   | $K_x$ | 1.633055 | | | |
|   | AR | −5.16785 × 10⁻⁸ | | | |
|   | BR | 2.0965 × 10⁻¹² | | | |
|   | AP | 0.595412 | | | |
|   | BP | 0.638703 | | | |
| 5 | | −61.610 | | 1.6792 | 51.00 |
|   | | | | Y 18.019 | θ 29.91° |
|   | | | | Z 60.673 | |
| 6 | $R_y$ | −735.371 | | 1.6792 | 51.00 |
|   | $R_x$ | ∞ | | Y −18.782 | θ −7.75° |
|   | $K_y$ | 0 | | Z 44.607 | |
|   | $K_x$ | 0 | | | |
|   | AR | −1.57554 × 10⁻⁸ | | | |
|   | BR | 9.32392 × 10⁻¹⁴ | | | |
|   | AP | −1.67996 | | | |
|   | BP | 0.122856 | | | |
| 7 | | −290.903 | | Y −40.650 | θ −69.40° |
|   | | | | Z 38.685 | |
| 8 | | (display device) | | Y −44.086 | θ −35.00° |
|   | | | | Z 77.749 | |

(1) $R_{y2}/R_{x2} = 0.891$
(3) $\alpha = 66.24°$

EXAMPLE 10

| Parameter No. | | Radius of curvature | Surface separation | Refractive index (Eccentricity) | Abbe's No. (Inclination angle) |
|---|---|---|---|---|---|
| 1 | | ∞(pupil) | 27.648 | | |
| 2 | $R_y$ | −127.773 | | 1.7394 | 45.06 |
|   | $R_x$ | −74.145 | | Y −39.982 | θ −19.01° |
|   | $K_y$ | 0 | | | |
|   | $K_x$ | 0 | | | |
|   | AR | 3.66126 × 10⁻⁷ | | | |
|   | BR | 1.819 × 10⁻¹¹ | | | |
|   | AP | −0.356073 | | | |
|   | BP | −0.699016 | | | |
| 3 | $R_y$ | −81.881 | | 1.7394 | 45.06 |
|   | $R_x$ | −68.040 | | Y 28.434 | θ 39.91° |
|   | $K_y$ | −0.111977 | | Z 37.099 | |
|   | $K_x$ | −0.354898 | | | |
|   | AR | 5.28817 × 10⁻¹² | | | |
|   | BR | 3.7857 × 10⁻¹² | | | |
|   | AP | 37.4793 | | | |
|   | BP | −0.751459 | | | |
| 4 | $R_y$ | −127.773 | | 1.7394 | 45.06 |
|   | $R_x$ | −74.145 | | Y −39.982 | θ −19.01° |
|   | $K_y$ | 0 | | Z 27.648 | |
|   | $K_x$ | 0 | | | |
|   | AR | 3.66126 × 10⁻⁷ | | | |
|   | BR | 1.819 × 10⁻¹¹ | | | |
|   | AP | −0.356073 | | | |
|   | BP | −0.699016 | | | |
| 5 | | −21.067 | 1.567 | 1.7550 | 27.60 |
|   | | | | Y −33.151 | θ −59.68° |
|   | | | | Z 46.009 | |
| 6 | | −66.347 | | | |
| 7 | | (display device) | | Y −36.167 | θ −50.37° |
|   | | | | Z 52.703 | |

(1) $R_{y2}/R_{x2} = 1.203$
(2) $r_1/r_2 = 1.56$
(3) $\alpha = 50.09°$

EXAMPLE 11

| Parameter No. | | Radius of curvature | Surface separation | Refractive index (Eccentricity) | Abbe's No. (Inclination angle) |
|---|---|---|---|---|---|
| 1 | | ∞(pupil) | 25.000 | | |
| 2 | | 123.041 | 6.500 | 1.5940 | 61.72 |
|   | | | | Y −24.800 | θ 5.787° |
| 3 | | −594.632 | | | |
| 4 | | 239.449 | | 1.4870 | 70.40 |
|   | | | | Y −6.355 | θ 14.22° |
|   | | | | Z 34.191 | |
| 5 | $R_y$ | −408.357 | | 1.4870 | 70.40 |
|   | $R_x$ | −239.896 | | Y −11.547 | θ 27.47° |
|   | $K_y$ | −59.547081 | | Z 63.131 | |
|   | $K_x$ | 29.562822 | | | |
|   | AR | 2.289885 × 10⁻⁷ | | | |
|   | BR | 8.51773 × 10⁻¹¹ | | | |
|   | AP | −0.538645 | | | |
|   | BP | −0.20468 | | | |
| 6 | | 239.449 | | 1.4870 | 70.40 |
|   | | | | Y −6.355 | θ 34.19° |
|   | | | | Z 34.191 | |
| 7 | | 35.931 | | Y −36.256 | θ −31.36° |
|   | | | | Z 52.780 | |
| 8 | | (display device) | | Y −36.901 | θ −6.46° |
|   | | | | Z 70.463 | |

(1) $R_{y2}/R_{x2} = 1.702$
(3) $\alpha = 62.53°$

EXAMPLE 12

| Parameter No. | | Radius of curvature | Surface separation | Refractive index (Eccentricity) | Abbe's No. (Inclination angle) |
|---|---|---|---|---|---|
| 1 (1) | | ∞(pupil) | 26.360 | | |
| 2 (3) | $R_y$ | −108.187 | | 1.4922 | 57.50 |
|   | $R_x$ | −73.105 | | Y −24.028 | θ −14.70° |
|   | $K_y$ | 0 | | | |
|   | $K_x$ | 0 | | | |
|   | AR | 5.54186 × 10⁻⁷ | | | |
|   | BR | 8.17563 × 10⁻¹¹ | | | |
|   | AP | −0.0804376 | | | |
|   | BP | −1.37947 | | | |
| 3 (4) | $R_y$ | −69.871 | | 1.4922 | 57.50 |
|   | $R_x$ | −60.374 | | Y 19.109 | θ 36.66° |
|   | $K_y$ | −0.136826 | | Z 33.339 | |
|   | $K_x$ | −0.123306 | | | |
|   | AR | −7.23291 × 10⁻¹¹ | | | |
|   | BR | −4.52937 × 10⁻¹² | | | |
|   | AP | 29.0752 | | | |
|   | BP | −2.08536 | | | |
| 4 (15) | $R_y$ | −108.187 | | 1.4922 | 57.50 |
|   | $R_x$ | −73.105 | | Y −24.028 | θ −14.70° |
|   | $K_y$ | 0 | | Z 48.339 | |
|   | $K_x$ | 0 | | | |
|   | AR | 5.54186 × 10⁻⁷ | | | |
|   | BR | 8.17563 × 10⁻¹¹ | | | |
|   | AP | −0.0804376 | | | |
|   | BP | −1.37947 | | | |

EXAMPLE 13

| Parameter No. | | Radius of curvature | Surface separation | Refractive index (Eccentricity) | Abbe's No. (Inclination angle) |
|---|---|---|---|---|---|
| 1 (1) | | ∞(pupil) | 20.267 | | |
| 2 (3) | $R_y$ | −420.378 | | 1.4922 | θ 57.50 |
|   | $R_x$ | −99.789 | | Y −49.262 | θ −13.94° |
|   | $K_y$ | 5.709616 | | | |
|   | $K_x$ | −2.785007 | | | |
|   | AR | 5.37533 × 10⁻⁷ | | | |
|   | BR | −6.41106 × 10⁻¹¹ | | | |

EXAMPLE 13-continued

| Parameter No. | Radius of curvature | | Surface separation | Refractive index (Eccentricity) | | Abbe's No. (Inclination angle) | |
|---|---|---|---|---|---|---|---|
| | AP | −0.422753 | | | | | |
| | BP | −0.455912 | | | | | |
| 3 (4) | $R_y$ | −122.291 | | Y | −34.556 | θ | 37.99° |
| | $R_x$ | −69.335 | | Z | 24.367 | | |
| | $K_y$ | 0.774787 | | | | | |
| | $K_x$ | −0.104426 | | | | | |
| | AR | $-1.82945 \times 10^{-9}$ | | | | | |
| | BR | $4.45272 \times 10^{-14}$ | | | | | |
| | AP | 5.40431 | | | | | |
| | BP | −1.13468 | | | | | |
| 4 (14) | $R_y$ | −122.291 | | | 1.4922 | | 57.50 |
| | $R_x$ | −69.335 | | Y | −34.556 | θ | 37.99° |
| | $K_y$ | 0.774787 | | Z | 26.000 | | |
| | $K_x$ | −0.104426 | | | | | |
| | AR | $-1.82945 \times 10^{-9}$ | | | | | |
| | BR | $4.45272 \times 10^{-14}$ | | | | | |
| | AP | 5.40431 | | | | | |
| | BP | −1.13468 | | | | | |
| 5 (15) | $R_y$ | −420.378 | | | 1.4922 | | 57.50 |
| | $R_x$ | −99.789 | | Y | −49.262 | θ | −13.94° |
| | $K_y$ | 5.709616 | | Z | 46.000 | | |
| | $K_x$ | −2.785007 | | | | | |
| | AR | $5.37533 \times 10^{-7}$ | | | | | |
| | BR | $-6.41106 \times 10^{-11}$ | | | | | |
| | AP | −0.422753 | | | | | |
| | BP | −0.455912 | | | | | |

Figure 16:
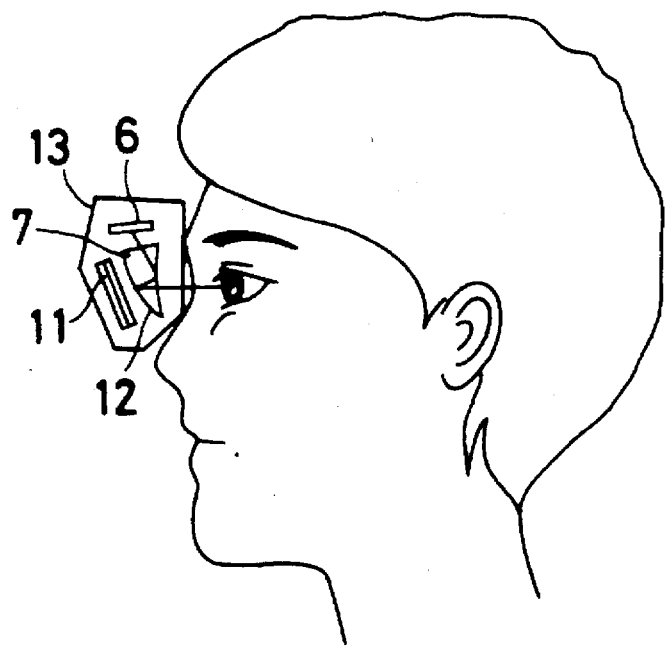
FIGS. 16(a) and 16(b) are sectional and perspective views showing a head-mounted image display apparatus according to the present invention.
Figure 16:
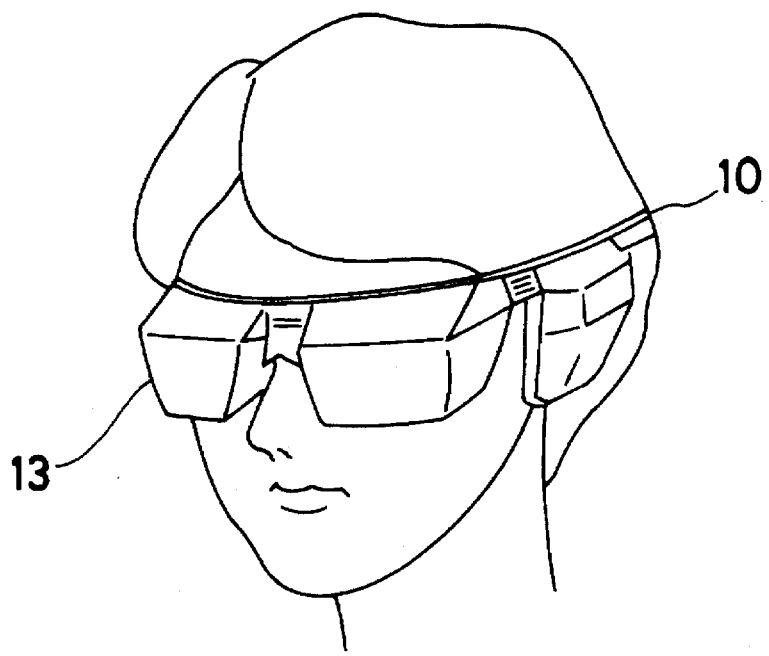

Although Examples in which the optical apparatus of the present invention is applied to an image display apparatus have been described above, it should be noted that the present invention is not necessarily limited to these Examples, and that various modifications may be imparted thereto. To arrange the optical apparatus of the present invention as a head-mounted image display apparatus (HMD) 13, as shown in the sectional view of FIG. 16(a) and the perspective view of FIG. 16(b), the HMD 13 is fitted to the observer's head by using a headband 10, for example, which is attached to the HMD 13. In this example of use, the HMD 13 may be arranged such that the second surface 2 of the ocular optical system is formed by using a semitransparent mirror (half-mirror) 12, and a liquid crystal shutter 11 is provided in front of the half-mirror 12, thereby enabling an outside world image to be selectively observed or superimposed on the image of the image display device.

Figure 17:
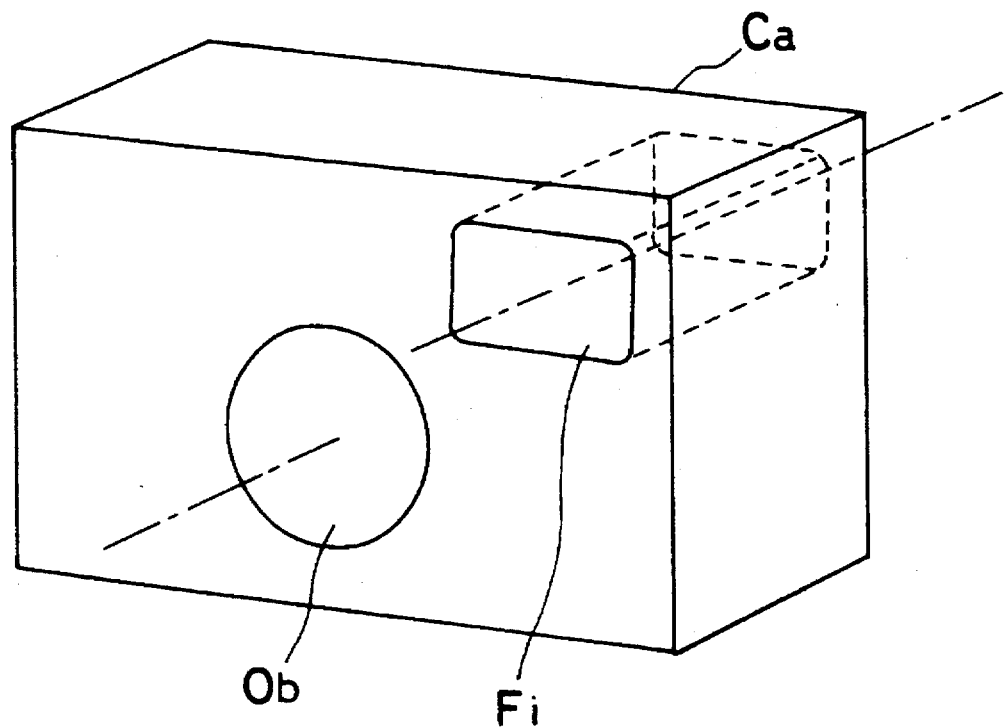
FIG. 17 shows an arrangement in a case where the optical apparatus of the present invention is used as an imaging optical system.
Figure 18:
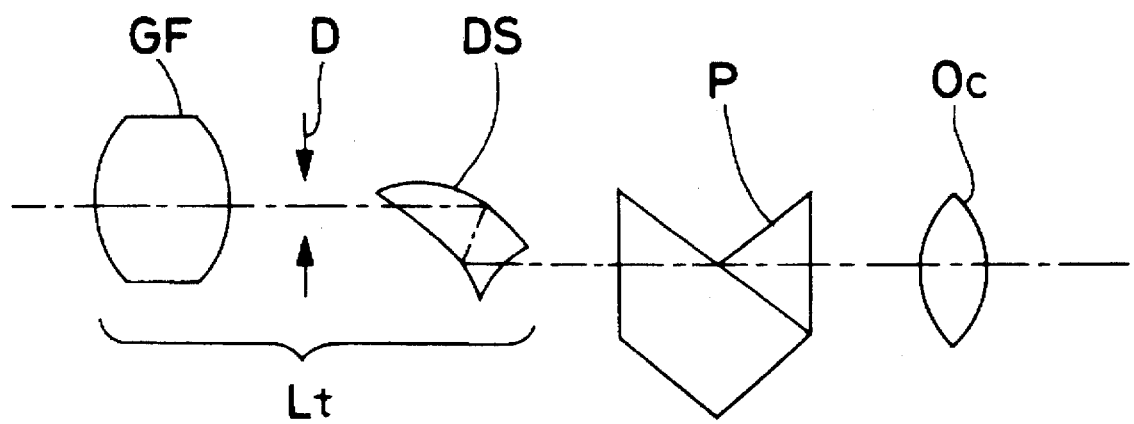
FIG. 18 shows an arrangement in a case where the optical apparatus of the present invention is used as an imaging optical system.
Figure 19:
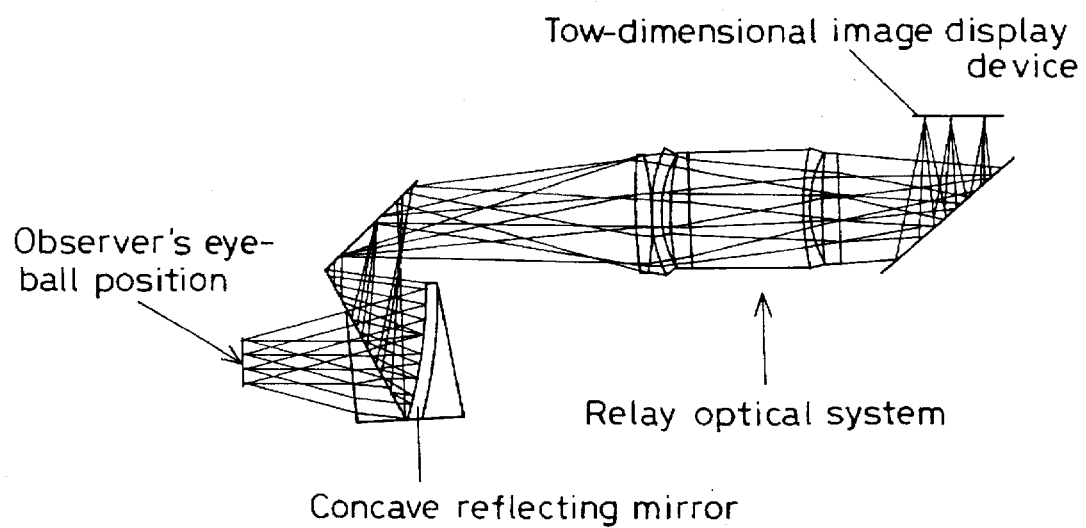
FIGS. 19(a) and 19(b) show the optical system of a conventional image display apparatus.
Figure 19:
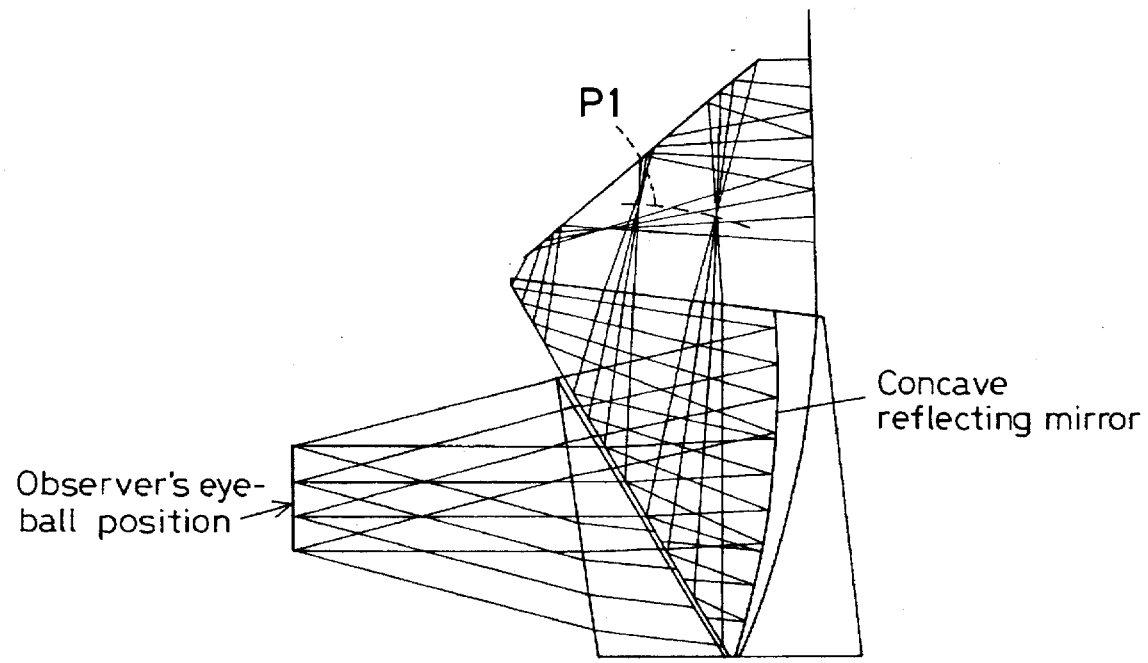
Figure 20:
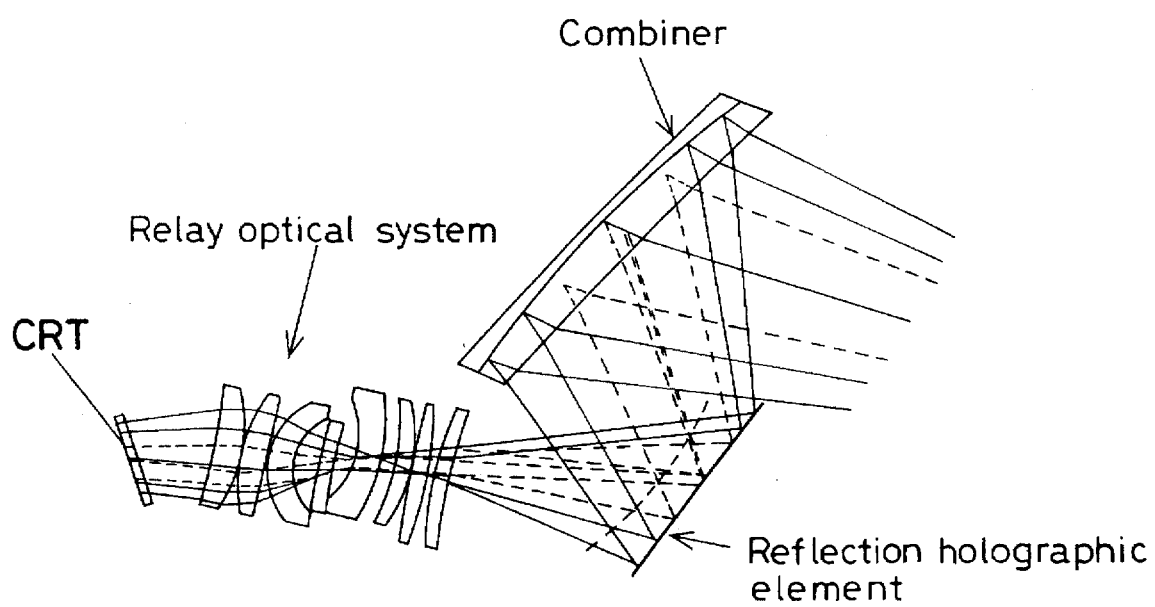
FIG. 20 shows the optical system of another conventional image display apparatus.
Figure 23:
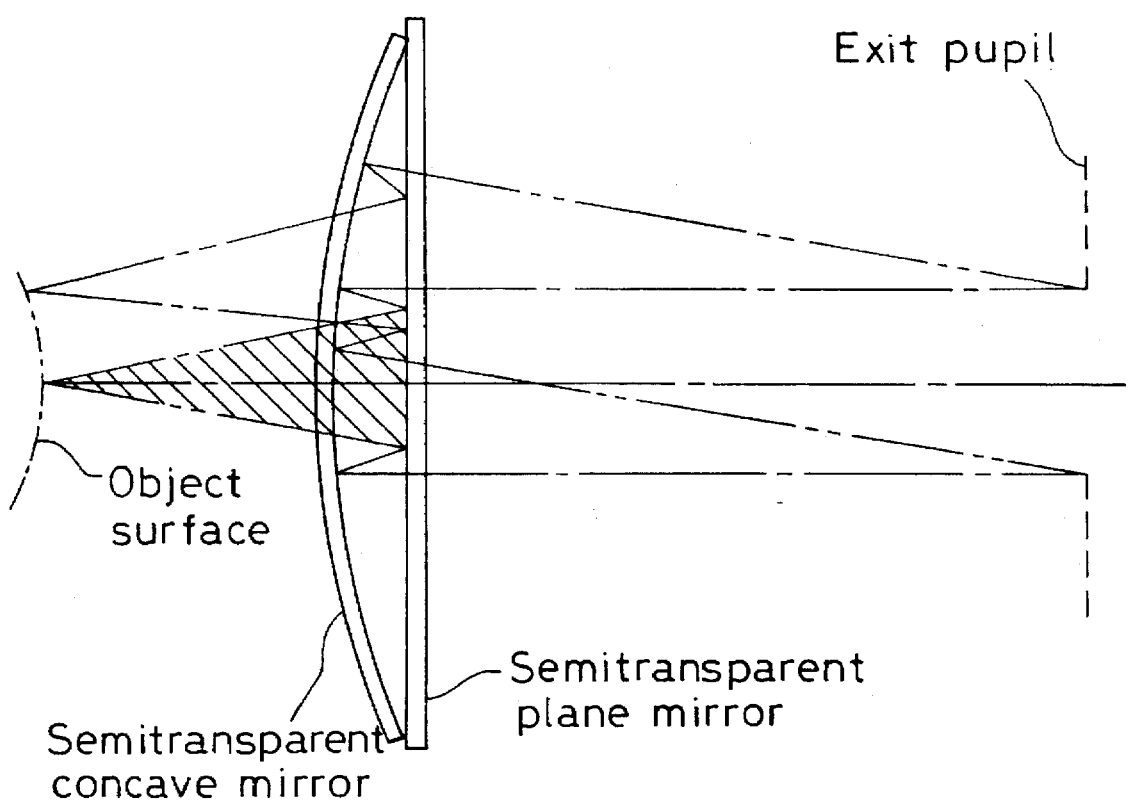
FIG. 23 shows the optical system of a still further conventional image display apparatus.

Further, the ocular optical system of the image display apparatus according to the present invention can be used as an imaging optical system. For example, as shown in the perspective view of FIG. 17, the ocular optical system may be used in a finder optical system $F_i$ of a compact camera $C_a$ in which a photographic optical system $O_b$ and the finder optical system $F_i$ are provided separately in parallel to each other. FIG. 18 shows the arrangement of an optical system in a case where the ocular optical system of the present invention is used as such an imaging optical system. As illustrated, the ocular optical system DS of the present invention is disposed behind a front lens group GF and an aperture diaphragm D, thereby constituting an objective optical system $L_r$. An image that is formed by the objective optical system $L_f$ is erected by a Porro prism P, in which there are four reflections, provided at the observer side of the objective optical system $L_r$, thereby enabling an erect image to be observed through an ocular lens $O_c$.

As will be clear from the foregoing description, the optical apparatus of the present invention makes it possible to provide an image display apparatus which has a wide field angle and is extremely small in size and light in weight, and a novel imaging optical system.

What we claim is:
1. An optical apparatus comprising:

a device for displaying an image; and an ocular optical system for projecting an image formed by said device for displaying an image and for leading the image to an observer's eyeball, said ocular optical system comprising first, second and third surfaces, in which a space defined by said first, second and third surfaces is filled with a medium having a refractive index larger than 1, said first, second and third surfaces including, in order from an observer's eyeball side toward said device for displaying an image, a first surface serving as both a refracting surface and an internally reflecting surface, a second surface serving as a reflecting surface of positive power which faces said first surface and is decentered or tilted with respect to an observer's visual axis, and a third surface serving as a refracting surface closest to said device for displaying an image, at least two of said at least three surfaces having a finite curvature radius;

wherein any one of said first, second and third surfaces is a decentered aspherical surface;

wherein any one of said first, second and third surfaces is an anamorphic surface;

wherein said optical apparatus satisfies the following condition in a case where a vertical plane containing said observer's visual axis is defined as a YZ-plane, and a horizontal plane containing said observer's visual axis is defined as an XZ-plane:

$$0.5 < R_{y2}/R_{x2} < 5$$

where $R_{y2}$ is a curvature radius of said second surface in the YZ-plane, and $R_{x2}$ is a curvature radius of said second surface in the XZ-plane.

2. An optical apparatus comprising:

a device for displaying an image; and an ocular optical system for projecting an image formed by said device for displaying an image and for leading the image to an observer's eyeball, said ocular optical system comprising first, second and third surfaces, in which a space defined by said at least first, second and third surfaces is filled with a medium having a refractive index larger than 1, said first, second and third surfaces including, in order from an observer's eyeball side toward said device for displaying an image, a first surface serving as both a refracting surface and an internally reflecting surface, a second surface serving as a reflecting surface of positive power which faces said first surface and is decentered or tilted with respect to an observer's visual axis, and a third surface serving as a refracting surface closest to said device for displaying an image, at least two of said at least first, second and third surfaces having a finite curvature radius;

wherein any one of said first, second and third surfaces is a decentered aspherical surface;

wherein any one of said first, second and third surfaces is an anamorphic surface;

wherein said optical apparatus satisfies the following condition in a case where a vertical plane containing said observer's visual axis is defined as a YZ-plane, and a horizontal plane containing said observer's visual axis is defined as an XZ-plane:

$$0.5 < R_{y2}/R_{x2} < 5$$

where $R_{y2}$ is a curvature radius of said second surface in the YZ-plane, and $R_{x2}$ is a curvature radius of said second surface in the XZ-plane, wherein internal reflection that is performed by said first surface is total reflection.

3. An optical apparatus comprising:

a device for displaying an image; and an ocular optical system for projecting an image formed by said device for displaying an image and for leading the image to an observer's eyeball, said ocular optical system comprising first, second and third surfaces, in which a space defined by said at least first, second and third surfaces is filled with a medium having a refractive index larger than 1, said first, second and third surfaces including, in order from an observer's eyeball side toward said device for displaying an image, a first surface serving as both a refracting surface and an internally reflecting surface, a second surface serving as a reflecting surface of positive power which faces said first surface and is decentered or tilted with respect to an observer's visual axis, and a third surface serving as a refracting surface closest to said device for displaying an image, at least two of said at least three surfaces having a finite curvature radius;

wherein any one of said first, second and third surfaces is a decentered aspherical surface;

wherein any one of said first, second and third surfaces is an anamorphic surface;

wherein said optical apparatus satisfies the following condition in a case where a vertical plane containing said observer's visual axis is defined as a YZ-plane, and a horizontal plane containing said observer's visual axis is defined as an XZ-plane:

$$0.5 < R_{y2}/R_{x2} < 5$$

where $R_{y2}$ is a curvature radius of said second surface in the YZ-plane, and $R_{x2}$ is a curvature radius of said second surface in the XZ-plane, wherein internal reflection that is performed by said first surface is total reflection, wherein said first surface has an internally reflecting region which has been mirror-coated.

4. An optical apparatus comprising:

a device for displaying an image; and an ocular optical system for projecting an image formed by said device for displaying an image and for leading the image to an observer's eyeball, said ocular optical system comprising first, second and third surfaces, in which a space defined by said at least first, second and third surfaces is filled with a medium having a refractive index larger than 1, said first, second and third surfaces including, in order from an observer's eyeball side toward said device for displaying an image, a first surface serving as both a refracting surface and an internally reflecting surface, a second surface serving as a reflecting surface of positive power which faces said first surface and is decentered or tilted with respect to an observer's visual axis, and a third surface serving as a refracting surface closest to said device for displaying an image, at least two of said at least first, second and third surfaces having a finite curvature radius; and wherein said first surface is a reflecting surface having a convex surface directed toward said second surface.

5. An optical apparatus comprising:

a device for displaying an image; and an ocular optical system for projecting an image formed by said device for displaying an image and for leading the image to an observer's eyeball, said ocular optical system comprising first, second and third surfaces, in which a space defined by said at least first, second and third surfaces is filled with a medium having a refractive index larger than 1, said first, second and third surfaces including, in order from an observer's eyeball side toward said device for displaying an image, a first surface serving as both a refracting surface and an internally reflecting surface, a second surface serving as a reflecting surface of positive power which faces said first surface and is decentered or tilted with respect to an observer's visual axis, and a third surface serving as a refracting surface closest to said device for displaying an image, at least two of said at least first, second and third surfaces having a finite curvature radius;

wherein internal reflection that is performed by said first surface is total reflection, and wherein said first surface is a reflecting surface having a convex surface directed toward said second surface.

6. An optical apparatus according to claim 4 or 5, wherein either one of said first and third surfaces of said ocular optical system is tilted or decentered with respect to said observer's visual axis.

7. An optical apparatus according to claim 6, further comprising means for positioning both said device for displaying an image and said ocular optical system with respect to an observer's head.

8. An optical apparatus according to claim 6, further comprising means for supporting both said device for displaying an image and said ocular optical system with respect to an observer's head so that said optical apparatus can be fitted to said observer's head.

9. An optical apparatus according to claim 6, further comprising means for supporting at least a pair of said optical apparatuses at a predetermined spacing.

10. An optical apparatus according to claim 6, wherein said ocular optical system is used as an imaging optical system.

11. An optical apparatus according to claim 6, which satisfies the following condition:

$$10° \leq \alpha \leq 40° \quad (3)$$

where $\alpha$ is an angle between said visual axis and a line normal to said second surface of said ocular optical system in the vicinity of an intersection between said observer's visual axis and said second surface.

12. An optical apparatus according to claim 11, further comprising means for positioning both said device for displaying an image and said ocular optical system with respect to an observer's head.

13. An optical apparatus according to claim 11, further comprising means for supporting both said device for displaying an image and said ocular optical system with respect to an observer's head so that said optical apparatus can be fitted to said observer's head.

14. An optical apparatus according to claim 11, further comprising means for supporting at least a pair of said optical apparatuses at a predetermined spacing.

15. An optical apparatus according to claim 11, wherein said ocular optical system is used as an imaging optical system.

16. An optical apparatus according to claim 11, wherein said device for displaying an image has a display surface which is tilted with respect to said observer's visual axis.

17. An optical apparatus according to claim 16, further comprising means for positioning both said device for displaying an image and said ocular optical system with respect to an observer's head.

18. An optical apparatus according to claim 16, further comprising means for supporting both said device for displaying an image and said ocular optical system with respect to an observer's head so that said optical apparatus can be fitted to said observer's head.

19. An optical apparatus according to claim 16, further comprising means for supporting at least a pair of said optical apparatuses at a predetermined spacing.

20. An optical apparatus according to claim 16, wherein said ocular optical system is used as an imaging optical system.

21. An optical apparatus comprising:

a device for displaying an image; and an ocular optical system for projecting an image formed by said device for displaying an image and for leading said image to an observer's eyeball, said ocular optical system comprising at least first, second and third surfaces, in which a space defined by said surfaces is filled with a medium having a refractive index larger than 1, said device for displaying an image being disposed at a position facing said third surface, said first, second and third surfaces including, in order from an observer's eyeball side toward said device for displaying an image, said first surface serving as both a refracting surface and an internally reflecting surface, said second surface serving as a reflecting surface of a positive power which faces said first surface and is decentered or tilted with respect to an observer's visual axis, and said third surface serving as a refracting surface closest to said device for displaying an image, at least two of said at least first, second and third surfaces having a finite curvature radius, wherein any one of said first, second and third surfaces is a decentered aspherical surface, wherein any one of said first, second and third surfaces is an anamorphic surface, and said optical apparatus satisfies the following condition in a case where a vertical plane containing said observer's visual axis is defined as a YZ-plane, and a horizontal plane containing said observer's visual axis is defined as an XZ-plane:

$$0.5 < R_{y2}/R_{x2} < 5$$

where $R_{y2}$ is a curvature radius of said second surface in said YZ-plane, and $R_{x2}$ is a curvature radius of said second surface in said XZ-plane.

22. An optical apparatus comprising:

a device for displaying an image; and an ocular optical system for projecting an image formed by said device for displaying an image and for leading said image to an observer's eyeball, said ocular optical system comprising at least first, second and third surfaces, in which a space defined by said surfaces is filled with a medium having a refractive index larger than 1, said device for displaying an image being disposed at a position facing said third surface, said first, second and third surfaces including, in order from an observer's eyeball side toward said device for displaying an image, said first surface serving as both a refracting surface and an internally reflecting surface, said second surface serving as a reflecting surface of a positive power which faces said first surface and is decentered or tilted with respect to an observer's visual axis, and said third surface serving as a refracting surface closest to said device for displaying an image, at least two of said at least first, second and third surfaces having a finite curvature radius, wherein internal reflection that is performed by said first surface is total reflection, wherein any one of said first, second and third surfaces is a decentered aspherical surface, wherein any one of said first, second and third surfaces is an anamorphic surface, and said optical apparatus satisfies the following condition in a case where a vertical plane containing said observer's visual axis is defined as a YZ-plane, and a horizontal plane containing said observer's visual axis is defined as an XZ-plane:

$$0.5 < R_{y2}/R_{x2} < 5$$

where $R_{y2}$ is a curvature radius of said second surface in said YZ-plane, and $R_{x2}$ is a curvature radius of said second surface in said XZ-plane.

23. An optical apparatus comprising:

a device for displaying an image; and an ocular optical system for projecting an image formed by said device for displaying an image and for leading said image to an observer's eyeball, said ocular optical system comprising at least first, second and third surfaces, in which a space defined by said surfaces is filled with a medium having a refractive index larger than 1, said device for displaying an image being disposed at a position facing said third surface, said first, second and third surfaces including, in order from an observer's eyeball side toward said device for displaying an image, said first surface serving as both a refracting surface and an internally reflecting surface, said second surface serving as a reflecting surface of a positive power which faces said first surface and is decentered or tilted with respect to an observer's visual axis, and said third surface serving as a refracting surface closest to said device for displaying an image, at least two of said at least first, second and third surfaces having a finite curvature radius, wherein said first surface has an internally reflecting region which has been mirror-coated, wherein any one of said first, second and third surfaces is a decentered aspherical surface, wherein any one of said first, second and third surfaces is an anamorphic surface, and said optical apparatus satisfies the following condition in a case where a vertical plane containing said observer's visual axis is defined as a YZ-plane, and a horizontal plane containing said observer's visual axis is defined as an XZ-plane:

$$0.5 < R_{y2}/R_{x2} < 5$$

where $R_{y2}$ is a curvature radius of said second surface in said YZ-plane, and $R_{x2}$ is a curvature radius of said second surface in said XZ-plane.

24. An optical apparatus according to claim 21, 22 or 23, further comprising means for positioning both said device for displaying an image and said ocular optical system with respect to an observer's head.

25. An optical apparatus according to claim 21, 22 or 23, further comprising means for supporting both said device for displaying an image and said ocular optical system with respect to an observer's head so that said optical apparatus can be fitted to said observer's head.

26. An optical apparatus according to claim 21, 22 or 23, further comprising means for supporting at least a pair of said optical apparatuses at a predetermined spacing.

27. An optical apparatus according to claim 21, 22 or 23, wherein said ocular optical system is used as an imaging optical system.

28. An optical apparatus comprising:

a device for displaying an image; and an ocular optical system for projecting an image formed by said device for displaying an image and for leading said image to an observer's eyeball, said ocular optical system comprising at least first, second and third surfaces, in which a space defined by said surfaces is filled with a medium having a refractive index larger than 1, said device for displaying an image being disposed at a position facing said third surface, said first, second and third surfaces including, in order from an observer's eyeball side toward said device for displaying an image, said first surface serving as both a refracting surface and an internally reflecting surface, said second surface serving as a reflecting surface of a positive power which faces said first surface and is decentered or tilted with respect to an observer's visual axis, and said third surface serving as a refracting surface closest to said device for displaying an image, at least two of said at least first, second and third surfaces having a finite curvature radius, wherein said first surface is a reflecting surface having a convex surface directed toward said second surface.

29. An optical apparatus comprising:

a device for displaying an image; and an ocular optical system for projecting an image formed by said device for displaying an image and for leading said image to an observer's eyeball, said ocular optical system comprising at least first, second and third surfaces, in which a space defined by said surfaces is filled with a medium having a refractive index larger than 1, said device for displaying an image being disposed at a position facing said third surface, said first, second and third surfaces including, in order from an observer's eyeball side toward said device for displaying an image, said first surface serving as both a refracting surface and an internally reflecting surface, said second surface serving as a reflecting surface of a positive power which faces said first surface and is decentered or tilted with respect to an observer's visual axis, and said third surface serving as a refracting surface closest to said device for displaying an image, at least two of said at least first, second and third surfaces having a finite curvature radius, wherein internal reflection that is performed by said first surface is total reflection, and wherein said first surface is a reflecting surface having a convex surface directed toward said second surface.

30. An optical apparatus according to claim 28 or 29, further comprising means for positioning both said device for displaying an image and said ocular optical system with respect to an observer's head.

31. An optical apparatus according to claim 28 or 29, further comprising means for supporting both said device for displaying an image and said ocular optical system with respect to an observer's head so that said optical apparatus can be fitted to said observer's head.

32. An optical apparatus according to claim 28 or 29, further comprising means for supporting at least a pair of said optical apparatuses at a predetermined spacing.

33. An optical apparatus according to claim 28 or 29, wherein said ocular optical system is used as an imaging optical system.

* * * * *